United States Patent [19]

Tohda et al.

[11] Patent Number: 5,540,299

[45] Date of Patent: Jul. 30, 1996

[54] SYSTEM FOR DRIVING AN AUTOMOTIVE VEHICLE

[75] Inventors: Isao Tohda; Jiro Maebayashi; Shigefumi Hirabayashi, all of Hiroshima-ken, Japan

[73] Assignee: Mazda Motor Corporation, Hiroshima, Japan

[21] Appl. No.: 159,502

[22] Filed: Nov. 30, 1993

[30] Foreign Application Priority Data

| Nov. 30, 1992 | [JP] | Japan | 4-343477 |
| Nov. 30, 1992 | [JP] | Japan | 4-343482 |
| Nov. 30, 1992 | [JP] | Japan | 4-343485 |
| Dec. 25, 1992 | [JP] | Japan | 4-359270 |
| Feb. 22, 1993 | [JP] | Japan | 5-031647 |

[51] Int. Cl.⁶ .................. F16H 47/00; B60K 17/356
[52] U.S. Cl. .................. 180/243; 180/242; 180/244; 180/308; 74/732.1
[58] Field of Search .................. 180/242, 305, 180/308, 233, 243, 244, 245, 248, 249, 250, 197, 307; 74/732.1

[56] References Cited

U.S. PATENT DOCUMENTS

| 4,236,595 | 12/1980 | Beck et al. | 180/243 |
| 4,399,886 | 8/1983 | Pollman | 180/197 |
| 4,401,182 | 8/1983 | Pollman | 180/197 X |
| 4,480,502 | 11/1984 | Nembach | 180/243 X |
| 4,528,871 | 7/1985 | Nembach | 180/243 X |
| 5,361,208 | 11/1994 | Olson et al. | 180/243 X |
| 5,368,120 | 11/1994 | Sakai et al. | 180/243 X |

FOREIGN PATENT DOCUMENTS

| 57-74222 | 5/1982 | Japan . |
| 63-38031 | 2/1988 | Japan . |
| 2-120136 | 5/1990 | Japan . |

Primary Examiner—Eric D. Culbreth
Assistant Examiner—F. Zeender
Attorney, Agent, or Firm—Fish & Richardson P.C.

[57] ABSTRACT

The left rear wheel is driven with the left motor and the right rear wheel is driven with the right motor. Selection of a control mode is made from a first control mode in which the left and right motors are driven in common and a second control mode in which the left and right motors are driven discretely and separately. A region in which the motors are driven is so arranged as to be altered in accordance with the running state of the vehicle, such as the lateral acceleration acting upon the vehicle body, the road surface friction coefficient μ, the vehicle speed, the steered angle of the steering wheel, etc. A clutch can be disposed to couple the left and right wheels to be driven with the motors when a predetermined condition is met. When the motor is of a hydraulic type, the accumulator for accumulating the hydraulic pressure is disposed to thereby drive the secondarily driven wheels by the motors by taking advantage of the hydraulic pressure from the accumulator, in addition to the driving of the engine, leading to an increase in acceleration with a force larger than the force generated by the engine.

33 Claims, 21 Drawing Sheets

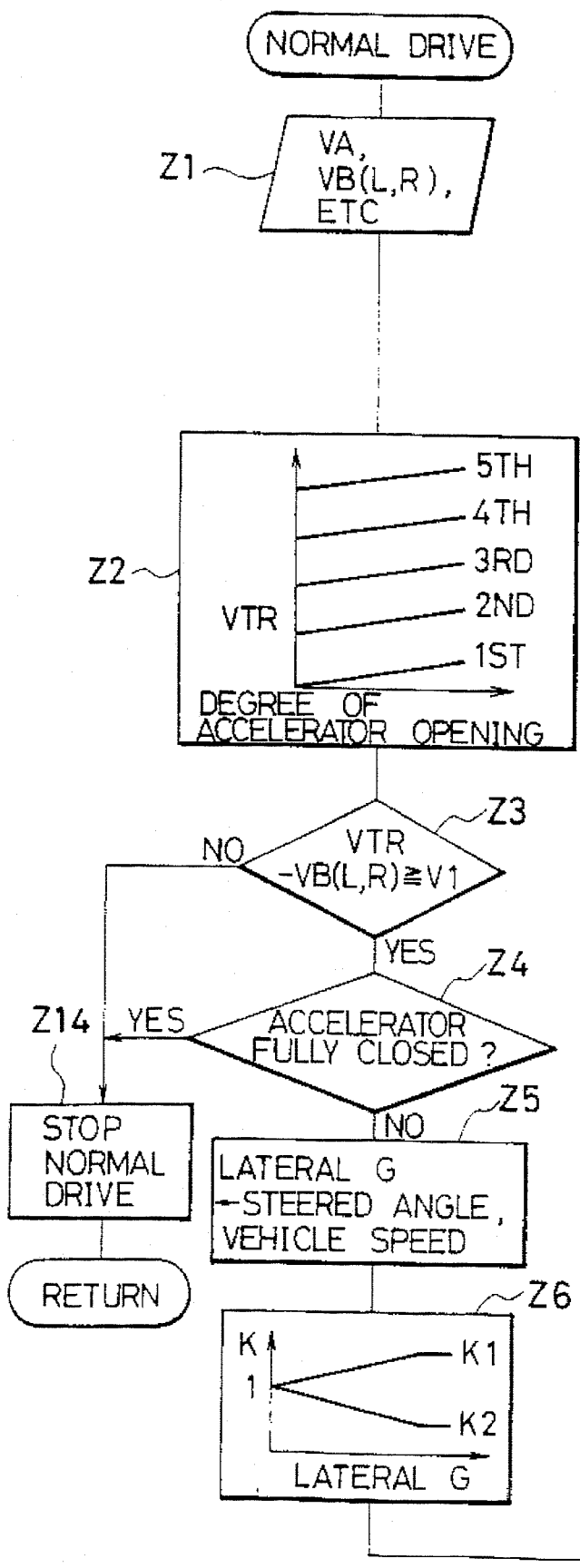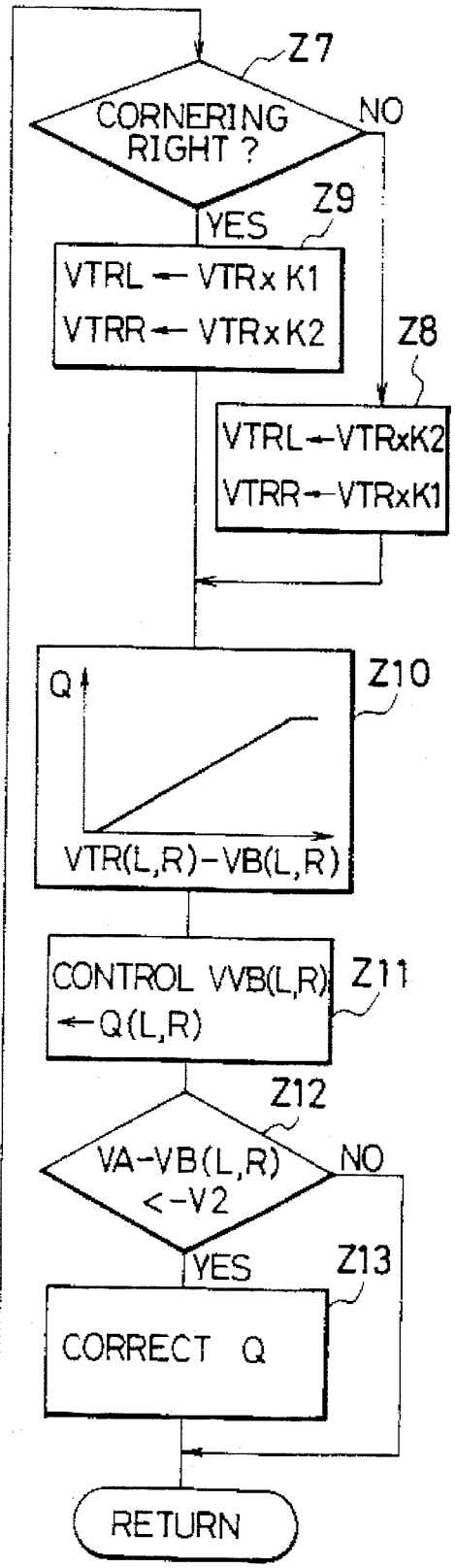
FIG. 9

SYSTEM FOR DRIVING AN AUTOMOTIVE VEHICLE

BACKGROUND OF THE INVENTION

1. Field of the Invention

The present invention relates to a system for driving an automotive vehicle and, more particularly, to a vehicle drive system so adapted as to control the driving of the vehicle with a motor as well as with an engine.

2. Description of the Related Art

There is recently the growing tendency that four-wheel drive cars are increasing, which have either of their front wheels and rear wheels driven with an internal combustion engine as primarily driven wheels and the other wheels driven with a motor as secondarily driven wheels, in order to decrease the weight of the vehicle body or for other reasons.

Japanese Patent Unexamined Publication No. 2-120,136 discloses a vehicle drive system which is so adapted as to change the driving force to be applied to the secondarily driven wheels from two motors having different driving forces. This vehicle drive system is such that the kinds and the number of the motors to be employed for driving the secondarily driven wheels are changed in accordance with the speed range of the transmission.

Further, Japanese Patent Unexamined Publication No. 57-74,222 discloses a vehicle drive system in which the function of a differential is added so as to have the hydraulic pressure supplied and distributed automatically to the left and right hydraulic motors (hydraulic cylinders) in accordance with the road surface load incurred upon the left and right secondarily driven wheels.

In addition, Japanese Patent Unexamined Publication No. 63-38,031 discloses a vehicle drive system employing left and right two electrically drivable motors which are so arranged as to make the torques generated by the motors constant by making the generated voltage larger as the vehicle speed becomes higher and which allows a manual switch to shift the status of the driving with the motors between execution and suspension of the driving.

The following should be taken into account, however, for the vehicle so arranged for its secondarily driven wheels as to be drivable with a motor.

First, it is of significance for such a vehicle to ensure stability in running straight and to set a preferred cornering characteristic; however, it is considerably difficult to meet such two requirements to a satisfactory extent. The vehicle characteristics comprising stability in running straight and the preferred cornering characteristic can basically be ensured by the setting of a suspension. In addition, such vehicle characteristics can be ensured by employing a unique device or system such as a rear wheel steering system or device.

Secondly, for such a vehicle as arranged for its secondarily driven wheels to be driven with the motors, it is of significance to determine a situation or condition in which the secondarily driven wheels are to be driven with the motor. It is not preferred in terms of fuel economy that the secondarily driven wheels be driven at random because the driving energy for driving the motor has to be gained eventually from the engine. Further, it is not preferred, too, that the execution of driving the motor is restricted more often than necessary from the point of view of saving energy, because the significance of driving the secondarily driven wheels with the motor may not become very meaningful. In addition, it can be noted that the four-wheel driven state, in which the secondarily driven wheels are driven with the motors, differ from the two-wheel driven state, in which the driving of the motor is suspended, to a great extent in terms of vehicle characteristics such as stability of the vehicle body and cornering characteristic.

As is apparent from the description as made hereinabove, it can be understood that, even if a driving region in which the secondarily driven wheels are to be driven with the motor is set as constant from the point of view of fuel economy, for example, if the driving region is set on the basis of the time of acceleration only, the problems as described hereinabove cannot be solved in a sufficient fashion.

Thirdly, when the left and right secondarily driven wheels are driven with the motors, it is advantageous in terms of effective transmission of the driving force to the road surface that the left and right secondarily driven wheels are discretely and separately driven with the left and right motors, respectively. However, if the road situation varies to a great extent between the road portion at which one of the secondarily driven wheels is located and the road portion at which the other is located, the driving of the left and right secondarily driven wheels discretely and separately may sometimes suffer from the disadvantage in terms of ensuring stability of the vehicle body, because the situation may become likely to occur such that one of the secondarily driven wheels can transmit its driving force effectively onto the road surface while the other is likely to cause slipping.

Fourthly, it should be noted that the driving of the secondarily driven wheels with a conventional hydraulic motor is made by converting a portion of the torque generated by the engine into a form of hydraulic pressure and directly utilizing such hydraulic pressure as it is, and that the vehicle is not driven with any torque other than the torque generated by the engine. In other words, the torque generated by the engine is divided and distributed simply for driving the primarily driven wheels and the secondarily driven wheels. This does not cause any problem if the vehicle with such arrangement is considered as a simplified four-wheel drive car for running snow road for a long period of time.

Recently, in order to enhance acceleration or for other reasons, it is considered to temporarily drive the secondarily driven wheels with a motor. In this case, even if the secondarily driven wheels are driven with the conventional hydraulic motor, the driving torque for driving the secondarily driven wheels having the torque larger than the torque generated by the engine cannot be provided. Hence, this arrangement gives rise to the situation in which requirements for improving acceleration or other matters cannot be met to a sufficient extent.

SUMMARY OF THE INVENTION

With the first point as described above taken into account, the present invention has the primary object to provide a vehicle drive system so adapted as to control the vehicle characteristics by utilizing a motor for driven wheels.

Further, with the second point as described above taken into account, the present invention has another object to provide a vehicle drive system so adapted as to appropriately set a driving region in which the secondarily driven wheels are to be driven with motors.

Furthermore, with the third point as described above considered, the present invention has a further object to provide a vehicle drive system so adapted as to ensure stability of the vehicle body by driving the left and right secondarily driven wheels discretely and separately with the left and right motors, respectively.

In addition, with the fourth point as described above taken into account, the present invention has a still further object to provide a vehicle drive system so adapted as to temporarily drive the vehicle with a torque larger than the torque generated by the engine by driving the secondarily driven wheels with the motor or motors.

In order to achieve the primary object as described hereinabove, the present invention consists of a vehicle drive system for driving an automotive vehicle having either of its left and right front wheels or left and right rear wheels driven with an engine as primarily driven wheels and the other driven with a motor means as secondarily driven wheels, comprising:

said motor means comprising a left motor for driving the left secondarily driven wheel and a right motor for driving the right secondarily driven wheel;

a first control means for an integrated mode for controlling the driving of said left motor and said right motor so for the numbers of rotation of said left secondarily driven wheel and said right secondarily driven wheel as to become equal to each other, when a running state of the vehicle exists in a preset first control region; and a second control means for an independent mode for discretely and separately controlling the driving of said left motor and said right motor so for the number of rotation of each of said left secondarily driven wheel and said right secondarily driven wheel as to become its own number of rotation preset discretely and separately for said left secondarily driven wheel and said right secondarily driven wheel, respectively, when a running state of the vehicle exists in a second control region preset as a region different from said first control region.

This configuration of the vehicle drive system according to the present invention is preferred in order to improve stability in running straight because the rear wheels are so arranged as to be rotatable at the same numbers of rotation, when the control is executed by the first control means. Further, this arrangement of the configuration is advantageous in terms of allowing for the preferred vehicle characteristics by correcting steering characteristics of the vehicle, etc. because the respective numbers of rotation of the left and right secondarily driven wheels are controlled so as to become the numbers of rotation, which are set discretely and separately from each other, when the control is executed by the second control means. As described hereinabove, the present invention is preferred in order to achieve preferred vehicle characteristics by effectively utilizing the motor, in addition to ensuring the driving force by the motor, because the control by the first control means is appropriately shared with the control by the second control means or vice versa.

In order to achieve such another object as described hereinabove, the present invention consists of a vehicle drive system for driving an automotive vehicle having either of its left and right front wheels or left and right rear wheels driven with an engine as primarily driven wheels and the other wheels driven with a motor means as secondarily driven wheels, comprising:

a drive control means for controlling the driving of said motor means so as to drive said secondarily driven wheels in the same direction in which said primarily driven wheels are driven with said engine, only when a running state of said vehicle exists in a predetermined driving region; and a driving-region altering means for altering said driving region in accordance with said running state of the vehicle.

This arrangement of the vehicle drive system can alter the driving region for driving the motor into an optimally set region in accordance with the situation which the vehicle faces; hence, this vehicle drive system is preferred in order to improve drivability of the vehicle as a whole by utilizing the driving of the motor. This arrangement is also preferred in order to achieve a high degree of fuel economy and maintain good vehicle characteristics to an appropriate extent.

Further, in order to achieve the third object as described hereinabove, the present invention consists of a vehicle drive system for driving an automotive vehicle having either of its left and right front wheels or left and right rear wheels driven with an engine as primarily driven wheels and the other wheels driven with a motor means as secondarily driven wheels, comprising:

said motor means comprising a pair of left and right motors disposed for driving said left and right secondarily driven wheels discretely and separately; and a clutch for mechanically coupling said left and right secondarily driven wheels when a predetermined condition is set.

This vehicle drive system can usually transmit the driving force onto the road surface effectively by driving the left and right secondarily driven wheels discretely and separately with the left and right motors, respectively, and it can mechanically couple the left and right secondarily driven wheels by coupling the clutch as needed, thereby allowing for stability of the vehicle.

Furthermore, in order to achieve the still further object as described hereinabove, the present invention consists of a vehicle drive system for driving an automotive vehicle having a first drive means for driving either of left and right front wheels or left and right rear wheels with an engine and a second drive means for driving the other wheels with an actuator, comprising:

said second drive means having an energy-accumulating means for accumulating driving energy for driving said actuator;

wherein said wheels are driven by operating said actuator with the driving energy accumulated with said energy-accumulating means discretely and separately from driving force generated by the engine.

This arrangement of the vehicle drive system can drive the vehicle with the torque larger than the torque generated by the engine by the portion corresponding to the driving force for driving the motor, by utilizing the energy accumulated in the energy-accumulating means, thereby complying with a temporary requirement for increasing the driving force.

Other objects, features and advantages of the present invention will become apparent in the course of the description of the preferred embodiments with reference to the accompanying drawings.

BRIEF DESCRIPTION OF THE DRAWINGS

FIGS. 3–12 are each a flow chart showing a control example according to the present invention.

FIGS. 13–15 are directed to another embodiment of the present invention, in which:

FIG. 13 is a flow chart showing a modification in an essential portion of FIG. 4;

FIG. 14 is a flow chart showing the control in a bad road condition; and

FIG. 15 is a flow chart to be replaced with that of FIG. 8.

FIGS. 16–17 are directed to a further embodiment of the present invention, in which:

FIGS. 16–17 are flow charts showing the control in a bad road condition, which are to be replaced with that of FIG. 14.

FIGS. 18–22 are directed to a still further embodiment of the present invention, in which:

FIG. 18 is a flow chart showing a modification of the essential portion of the flow chart 4;

FIG. 19 is a graph showing the control to be made in accordance with the pressure accumulated in the accumulator;

FIGS. 20–21 are each a flow chart showing an example of the control for driving the motor by utilizing the pressure accumulated in the accumulator; and FIG. 22 is a block diagram showing the relationship of each means related to the control to be made as shown in FIGS. 20 and 21.

DESCRIPTION OF THE PREFERRED EMBODIMENTS

The present invention will be described by way of examples with reference to the accompanying drawings.

Figure 1:
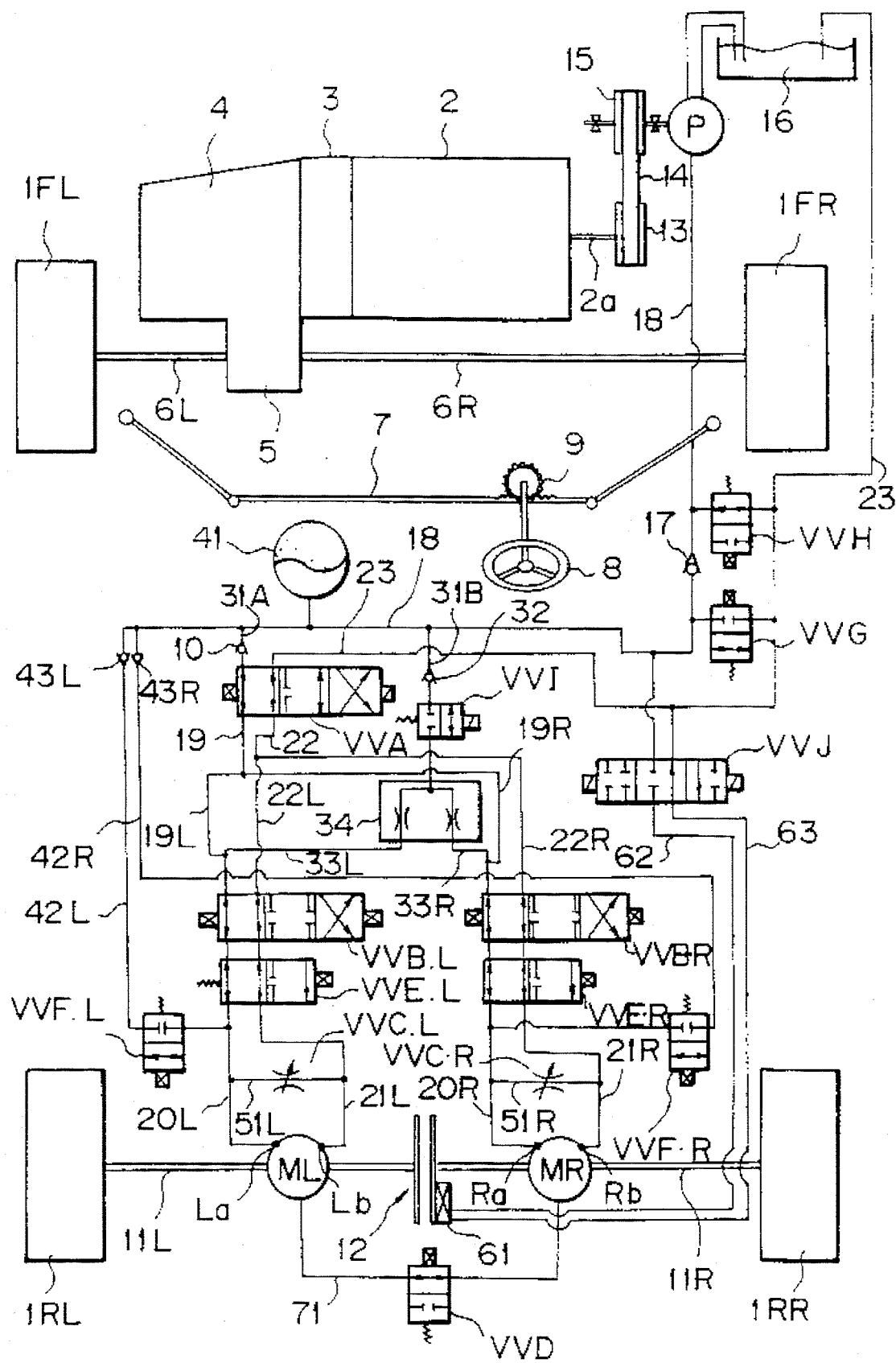
FIG. 1 is a block diagram showing an example of a hydraulic system to be employed for the present invention.

A description will be made of a hydraulic system with reference to FIG. 1.

A vehicle body has a left front wheel 1FL, a right front wheel 1FR, a left rear wheel 1RL and a right rear wheel 1RR and is loaded with an engine 2 at its front portion. A driving force or output torque of the engine 2 is transmitted through a clutch 3 and a manual transmission 4 with five forward and one rearward speed ranges to a differential 5. Thereafter, the driving force is transmitted to the left front wheel 1FL through a left drive shaft 6L and to the right front wheel 1FR through a right drive shaft 6R.

The left and right front wheels 1FL and 1FR, serving as steering wheels, are associated with each other through a steering link 7 such as a tie rod or other means, and the steering link 7 is then associated with a steering wheel 8 through a rack-and-pinion mechanism 9.

On the other hand, the left and right rear wheels 1RL and 1RR are disposed in such an arrangement as discrete and separate from the engine 2 and disposed so as to be driven with left and right hydraulic motors ML and MR, respectively. More specifically, the left rear wheel 1RL is drivable by the left hydraulic motor ML through the left drive shaft 11L and the right rear wheel 1RR is drivable by the right hydraulic motor MR through the right drive shaft 11R. The left hydraulic motor ML is disposed in such an arrangement as discrete and separate from the right hydraulic motor MR and, likewise, the left drive shaft 11L is in such an arrangement as discrete and separate from the right drive shaft 11R, thereby allowing the left drive shaft 11L to be driven independently and separately from the right drive shaft 11R.

Further, the left drive shaft 11L is so arranged as to be connected with or disconnected from the right drive shaft 11R through a hydraulic clutch 12.

The left hydraulic motor ML is of a turbine type and has a first connection opening La and a second connection opening Lb, and the right hydraulic motor MR is of a turbine type and has a first connection opening Ra and a second connection opening Rb. The left hydraulic motor ML and the right hydraulic motor MR is so arranged as to drive the left and right rear wheels 1RL and 1RR forwards, respectively, when high-pressure hydraulic liquid is flown from the first connection opening La and a second connection opening Lb and when high-pressure hydraulic liquid is flown from the first connection opening Ra and a second connection opening Rb, respectively. Conversely, the left and right rear wheels 1RL and 1RR are driven rearward when the high-pressure hydraulic liquid is flown in the direction opposite to the direction in which the high-pressure hydraulic liquid is flown from the first connection opening La and a second connection opening Lb and when high-pressure hydraulic liquid is flown from the first connection opening Ra and a second connection opening Rb, respectively. The left hydraulic motor ML has the same specification as the right hydraulic motor MR, and the sum of the maximal torques generated by the left and right hydraulic motors ML and MR is set to become approximately from a one third to a half of the torque generated by the engine 2.

In the embodiment, the respective rear wheels are driven with the left and right hydraulic motor ML and MR only under a predetermined condition as will be described hereinafter. In other words, there is the occasion that the left rear wheel 1RL is not driven with the left hydraulic motor ML or the right rear wheel 1RR is not driven with the right hydraulic motor MR, respectively, even when the left front wheels 1FL and 1FR are driven with the engine 2.

Reference symbol P designates a pump serving as a source for generating hydraulic pressure, and the pump P is shown to be of a volume variable type. The pump P is driven by an output shaft 2a of the engine 2 through a driving pulley 13, a belt 14 and a follower pulley 15 to be driven, thereby sucking high-pressure hydraulic liquid from a reservoir tank 16. The high-pressure hydraulic liquid is then discharged into a high-pressure line 18 with a check valve 17 connected thereto. The high-pressure line 18 extends and branches off into first and second hydraulic pressure supply lines 31A and 31B, which are disposed in parallel to or juxtaposed with each other. The first hydraulic pressure supply line 31A is provided with a check valve 10 and the second hydraulic pressure supply line 31B is provided with a check valve 32. The reservoir tank 18 has a release line 23. The left hydraulic motor ML has lines 20L and 21R disposed in a parallel relationship and extended, respectively, from its first connection opening La and its second connection opening Lb. Likewise, the right hydraulic motor MR has lines 20R and 21R disposed in a parallel relationship and extended, respectively, from its first connection opening Ra and its second connection opening Rb.

The line 20L of the left hydraulic motor ML is so arranged as to be communicated selectively with the first hydraulic pressure supply line 31A and the release line 23 through a change-over valve VVE-L, a change-over valve VVB-L, lines 19L and 19, and a change-over valve VVA, and the line 21L of the left hydraulic motor ML is so arranged as to be communicated selectively with the first hydraulic pressure supply line 31A and the release line 23 through the change-over valve VVE-L, the change-over valve VVB-L, lines 22L and 22, and the change-over valve VVA. Likewise, the line 20R of the right hydraulic motor MR is so arranged as to be communicated selectively with the first hydraulic pressure supply line 31A and the release line 23 through a change-over valve VVE-R, a change-over valve VVB-R, lines 19R and 19, and the change-over valve VVA, and the line 21R of the right hydraulic motor MR is so arranged as to be communicated selectively with the first hydraulic pressure supply line 31A and the release line 23 through the change-over valve VVE-R, the change-over valve VVB-R, lines 22R and 22, and the change-over valve VVA.

With the second hydraulic pressure supply line 31B are connected a change-over valve VVI in the position downstream of the check valve 32 and a flow dividing valve 34 in the position downstream of the change-over valve VVI. The flow dividing valve 34 divides the second hydraulic pressure supply line 31B into a left branch supply line 33L and a right branch supply line 33R. The left branch supply line 33L is connected with the line 19L while the right branch supply line 33R is connected with the line 19R.

To the high-pressure line 18 is connected an accumulator 41 for storing a high-pressure hydraulic pressure. The high-pressure line 18 is disposed to further extend from the point of connection with the first hydraulic pressure supply line 31A and to thereby branch off into a passage 42L and a passage 42R, through which the lines 20L and 20R are communicated respectively with the high-pressure line 18. The passage 42L is provided with a check valve 43L and a change-over valve VVF-L, and the passage 42R is provided with a check valve 43R and a change-over valve VVF-R. The passage 42L is disposed in a parallel arrangement with the passage 42R, and they are arranged so as to bypass the change-over valves VVA, VVB-L, VVB-R, VVE-L, VVE-R, VVI, and the flow dividing valve 34.

Further, the line 20L is communicated with the line 21L through a passage 51L, and the line 20R is communicated with the line 21R through a passage 51R. The passages 51L and 51R are provided respectively with variable orifices VVC-L and VVC-R.

Reference numeral 61 designates an actuator for connecting or disconnecting the clutch 12. The actuator 61 has a hydraulic pressure supply line 62 and a high-pressure discharge line 63 arranged to be communicated with the high-pressure line 18 and the release line 23, respectively, through a change-over valve VVJ that is so arranged as to cause both of the lines 62 and 63 to assume their blocked or closed states.

The left hydraulic motor ML is associated and communicated with the right hydraulic motor MR through a passage 71 that has an opening-closing valve VVD connected thereto.

The release line 23 is connected with the high-pressure line 18 through a load-and-unload valve VVH disposed in the position upstream of the check valve 17 (on the pump P side) and through a safety valve VVG disposed in the position downstream of the check valve 17.

Then, a control mode will be described with reference to Table as shown below.

In this embodiment, the system according to the present invention is provided with eight different kinds of control modes as will be described hereinafter. The table shows the status of operation of each of the valves as described hereinabove when each of the control modes is executed. In this table, the reference symbols "L" and "R", indicative of the left side and the right side, respectively, are omitted therefrom. Further, it should be noted that the load-and-unload valve VVH, not shown in the table, is so opened or closed as for the pressure of the high-pressure line 18 to exist in a predetermined range between an upper limit pressure and a lower limit pressure.

TABLE

| MODES | VALVES | | | | | | | | Clutch |
|---|---|---|---|---|---|---|---|---|---|
| | VVA | VVB | VVC | VVD | VVE | VVF | VVG | VVI | VVJ |
| 1 INTEGRATED | CT | OP | CL | CL | OP | CL | CL | CL | OP |
| 2 INDEPENDENT | CL | CT | CL | CL | OP | CL | CL | OP | CL |
| 3 LSD | CL | CL | CL | OP | OP | CL | CL | CL | CL |
| 4 HYDRAULIC PRESSURE-LOCKING | CL | CL | CT | CL | OP | CL | CL | CL | CL or OP |
| 5 HYDRAULIC PRESSURE-ACCUMULATING | OP | OP | CL | CL | CL | OP | CL | CL | CL or OP |
| 6 HALT | CL | CT | CL | CL | OP | CL | CL | OP | CL |
| 7 PARKING | CL | CL | CL | CL | OP | CL | CL | CL | OP |
| 8 F/S | | | | | | | OP | | |

NOTES:
CT = Controlled
OP = Opened (with clutch coupled)
CL = Closed (with clutch uncoupled)

A description will now be made of the status of operation of the valves having the primary actions in each of the control modes as shown in Table above.

1. Integrated mode

An integrated mode is arranged to control the driving of the left hydraulic motor ML and the right hydraulic motor MR so as to cause the left rear wheel 1RL to have the same number of wheel rotation as the number of wheel rotation of the right rear wheel 1RR or vice versa, in a fashion as will be described hereinafter. The integrated mode includes the normal driving of the left hydraulic motor ML and the right hydraulic motor MR (assisting drive the secondarily driven wheels so as to increase acceleration or to start the vehicle) and the reverse driving thereof (braking). In the integrated mode, the clutch 12 is coupled to thereby allow the change-over valve VVJ to open the line 62 and close the line 63, leading to the status of operation of the change-over valves VVB-L, VVB-R, VVE-L, VVE-R and VVI as shown in FIG. 1. In this status of operation, the change-over valve VVA is controlled to shift the direction of supply of the hydraulic pressure so as to comply with the normal driving or the reverse driving of the left hydraulic motor ML and the right hydraulic motor MR and the flow rate of the supply of the hydraulic pressure to the left hydraulic motor ML and the right hydraulic motor MR is controlled to thereby supply the hydraulic pressure through the first hydraulic pressure supply line 31A.

It is to be noted herein that the reverse driving of the left and right motors ML and MR at the integrated mode can provide the extent of deceleration larger than that obtainable at the hydraulic pressure-locking mode in a way as will be described hereinafter. As a matter of course, however, the reverse driving thereof does not provide such a driving force as great enough to rotate the left and right rear wheels 1RL and 1RR in the direction opposite to the direction in which the vehicle runs forwards.

2. Independent mode

The independent mode is arranged to control the driving of each of the left hydraulic motor ML and the right hydraulic motor MR so as to allow each of the left and right rear wheels 1RL and 1RR to become a target number of wheel rotation set independently and separately therefor. The independent mode includes the normal driving and the reverse driving, like the integrated mode. In the independent mode, the coupling of the clutch 12 is released to thereby cause the change-over valve VVJ to close the line 62 and open the line 63. Each of the change-over valves VVE-L and VVE-R is brought into a status of operation as shown in FIG. 1; however, the change-over valve VVA is brought into a central shift position to thereby block the first hydraulic pressure supply line 31A. On the other hand, the change-over valve VVI is brought into an open position to thereby allow for the supply of a hydraulic pressure through the second hydraulic pressure supply line 31B. In this state, the change-over valve VVB-L or the change-over valve VVB-R is controlled to control a shift of the direction of the supply of the hydraulic pressure so as to comply with the normal driving or the reverse driving of the left hydraulic motor ML and the right hydraulic motor MR and to control a flow rate of the supply of the hydraulic pressure to the left hydraulic motor ML and the right hydraulic motor MR.

3. LSD mode

The LSD mode is so adapted as to provide the function of restricting operation. More specifically, the change-over valves VVB-L and VVB-R are arranged to close the lines 20L, 21L and the lines 20R, 21R, thereby blocking thoroughly the supply to and discharge of the hydraulic pressure from the left and right hydraulic motors ML and MR, respectively. Then, the opening-closing valve VVD is opened to communicate a closed left hydraulic passage of the left hydraulic motor ML with a closed right hydraulic passage of the right hydraulic motor MR, thereby preventing the numbers of rotation from differing to a great extent between the left hydraulic motor ML and the right hydraulic motor MR. In this LSD mode, the variable orifices VVC-L and VVC-R are fully closed.

4. Hydraulic pressure-locking mode

The hydraulic pressure-locking mode is so adapted as to provide a force of deceleration by taking advantage of a resistance to a road surface, that is, a restriction resistance of the variable orifice VVC-L or VVC-R. In this hydraulic pressure-locking mode, each of the change-over valves VVB-L and VVB-R is shifted to a central shift position to thereby block the lines 20L, 21L and the lines 20R, 21R and close the opening-closing valve VVD, thereby opening the variable orifices VVC-L and VVC-R, respectively. In this state, hydraulic liquid is circulated through a closed hydraulic circuit containing the variable orifices VVC-L and VVC-R in accordance with the rotation of the respective hydraulic motors ML and MR. During the circulation of the hydraulic liquid, the restriction resistance of the variable orifices VVC-L and VVC-R is produced and it provides a force of deceleration during the period of time when the hydraulic liquid passes through the variable orifices VVC-L and VVC-R. The rate of opening of the variable orifices VVC-L and VVC-R is controlled so as to become smaller as the degree of deceleration becomes greater. The setting of the rate of opening of the variable orifices VVC-L and VVC-R is made so as to comply with the extent of deceleration in a manner as illustrated at step E37 in FIG. 4. In this mode, the clutch 12 can assume both of a coupled state and an uncoupled state.

5. Hydraulic pressure-accumulating mode

The hydraulic pressure-accumulating mode is so adapted as to accumulate a hydraulic pressure in the accumulator 41 during running by using the left hydraulic motor ML driven by the left rear wheel 1RL and the right hydraulic motor MR driven by the right rear wheel 1RR, to serve as a pump. In the hydraulic pressure-accumulating mode, each of the lines 21L and 21R is communicated with the reservoir tank 16, while the opening-closing valve VVF-L and VVF-R are opened, thereby pumping the hydraulic liquid within the reservoir tank 16 by means of the left hydraulic motor ML and the right hydraulic motor MR, respectively, and allow for the accumulation of the hydraulic pressure in the accumulator 41.

6. Halt mode

The halt mode is arranged such that the left hydraulic motor ML and the right hydraulic motor MR are driven so as to halt the vehicle body in such a state that a parking brake is not operated. In other words, the driving of the left hydraulic motor ML and the right hydraulic motor MR is so controlled as to cause the vehicle speed to become a target vehicle speed "0". In this case, the second hydraulic pressure supply line 31B is employed for supplying the hydraulic pressure and the supply and discharge of the hydraulic pressure is controlled by means of the change-over valves VVB-L and VVB-R.

7. Parking mode

The parking mode is so adapted as to enhance the action of maintaining the parking state of the vehicle body in such a state that the parking brake is operated. More specifically, in the parking mode, the change-over valves VVB-L and VVB-R are closed each in its central shift position, thereby blocking the line for the supplying or discharging the hydraulic pressure and coupling the clutch 12.

8. F/S mode

The F/S mode is a fail safe mode that is so arranged as to open the safety valve VVG to thereby release the hydraulic pressure in the high-pressure line 18 when something abnormal happens, for example, when the hydraulic pressure in the high-pressure line becomes abnormally high, when the left hydraulic motor ML or the right hydraulic motor MR cannot be driven in normal manner, when some valve is caused to be fixed, or when the temperature of hydraulic liquid becomes higher than a predetermined temperature.

Then, a control system will be described more in detail with reference to FIG. 2 which shows an example of the control system to be employed for the present invention.

Figure 2:
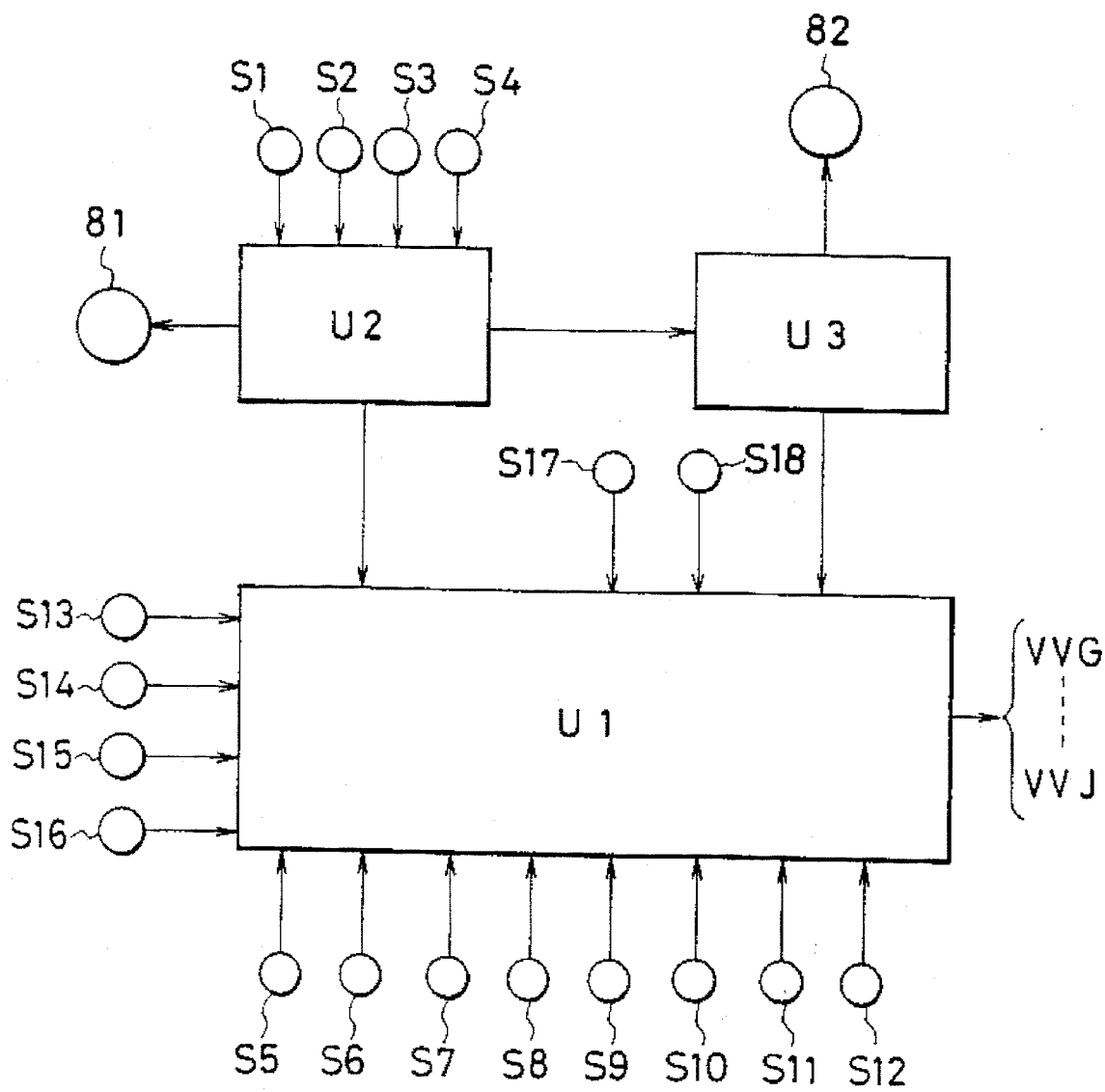
FIG. 2 is a block diagram showing an example of a control system to be employed for the present invention.

In FIG. 2, reference symbols U1, U2 and U3 designate each a control unit comprised of a microcomputer. The control unit U1 is a main control unit for controlling the valve VVA and the other valves as described hereinabove. The control unit U2 is so adapted as to execute ABS control (anti-lock brake control). Further, the control unit U3 is so adapted as to execute traction control.

Reference symbols S1, S2, S3 and S4 designate sensors, each sensing a speed of rotation, or a wheel speed, of the wheels 1FL, 1FR, 1RL and 1RR, respectively. The wheel speed of each wheel sensed by the sensors S1, S2, S3 and S4 is transmitted from the control unit U2 to the control units U1 and U3. A sensor S5 is arranged to sense a vehicle speed of the vehicle. In this embodiment, the sensor S5 is so adapted as to sense a vehicle speed of the vehicle relative to the road surface on which the vehicle is running, that is, to sense an absolute vehicle speed thereof. A sensor S6 is disposed for sensing a shift position, or a gear position, of the transmission 4. A sensor S7 is adapted to sense the number of rotation of the engine. A sensor S8 is arranged to sense a steered angle of the steering wheel. A sensor S9 is so adapted as to sense a rate or percentage of opening of an accelerator. A sensor S10 is arranged to sense an amount or rate of depression of a brake pedal. A switch S11 is an ignition switch and a switch S12 is a switch so arranged as to sense if a parking brake is under operation.

Further, a switch S13 is a manual switch so adapted as to select four control modes consisting of "AUTO" mode, "Integrated" mode, "Independent" mode, and "OFF" mode. A sensor S14 is disposed for sensing a bad road or a rough road. For example, the sensor S14 may be so arranged as to sense a vertical stroke of a suspension and the control unit U1 is arranged for determining the road on which the vehicle is running as a bad road when the vertical stroke larger than a predetermined value is sensed by the sensor S14 in a predetermined period of time at a frequency more often than predetermined times. The sensor S14 may further be so arranged as to sense a vertical G (acceleration) acting upon the vehicle body, thereby allowing the control unit U1 to determine the running road as a bad road when the vertical G larger than a predetermined value is sensed by the sensor S14 in a predetermined period of time at a frequency more often than predetermined times. The determination of the extent of roughness of such a bad road may be made by changing one or more threshold values for determining bad road.

Each of the sensors and the switches generates a signal to the control unit U1 that in turn is arranged to control the valves VVA, VVB, and so on. As described hereinabove, the control unit U2 is disposed in order to prevent the wheels from being locked during braking and it is so arranged as to control a braking liquid pressure adjusting means 81 for adjusting a brake of each wheel independently and separately. Further, the control unit U3 is so adapted as to reduce at least engine output (a torque generated by the engine 2), when the extent of slip of the left front wheel 1FL or right front wheel 1FR, serving always as driven wheels during acceleration, relative to the road surface becomes excessive or larger than a predetermined value. At this end, the control unit U3 controls a torque adjusting means 82, for example, by adjusting a rate or percentage of opening of a throttle valve of the engine 2, a timing of ignition, an amount of injection of fuel, or the like.

Signals sensed by the sensors S1, S2, S3 and S4, indicative of wheel speeds of the respective wheels, an ABS signal indicative of the execution of ABS control, and a μ signal indicative of a road surface friction coefficient μ are transmitted from the control unit U2 to the control unit U1. Further, the signals indicative of the wheel speeds are transmitted from the control unit U2 to the control unit U3. A TRC signal indicative of the execution of traction control, a signal indicative of an amount of a torque of the engine 2 reduced by the traction control, and a μ signal indicative of a road surface friction coefficient μ are transmitted from the control unit U3 to the control unit U1. Furthermore, the road surface friction coefficient μ may be detected by the control unit U1 and the wheel speeds sensed by the sensors S1, S2, S3 and S4 may be entered directly into the control unit U1.

Then, a description will be made of the control to be conducted by the control unit U1 with reference to flow charts of FIGS. 3 et seq.

Figure 3:
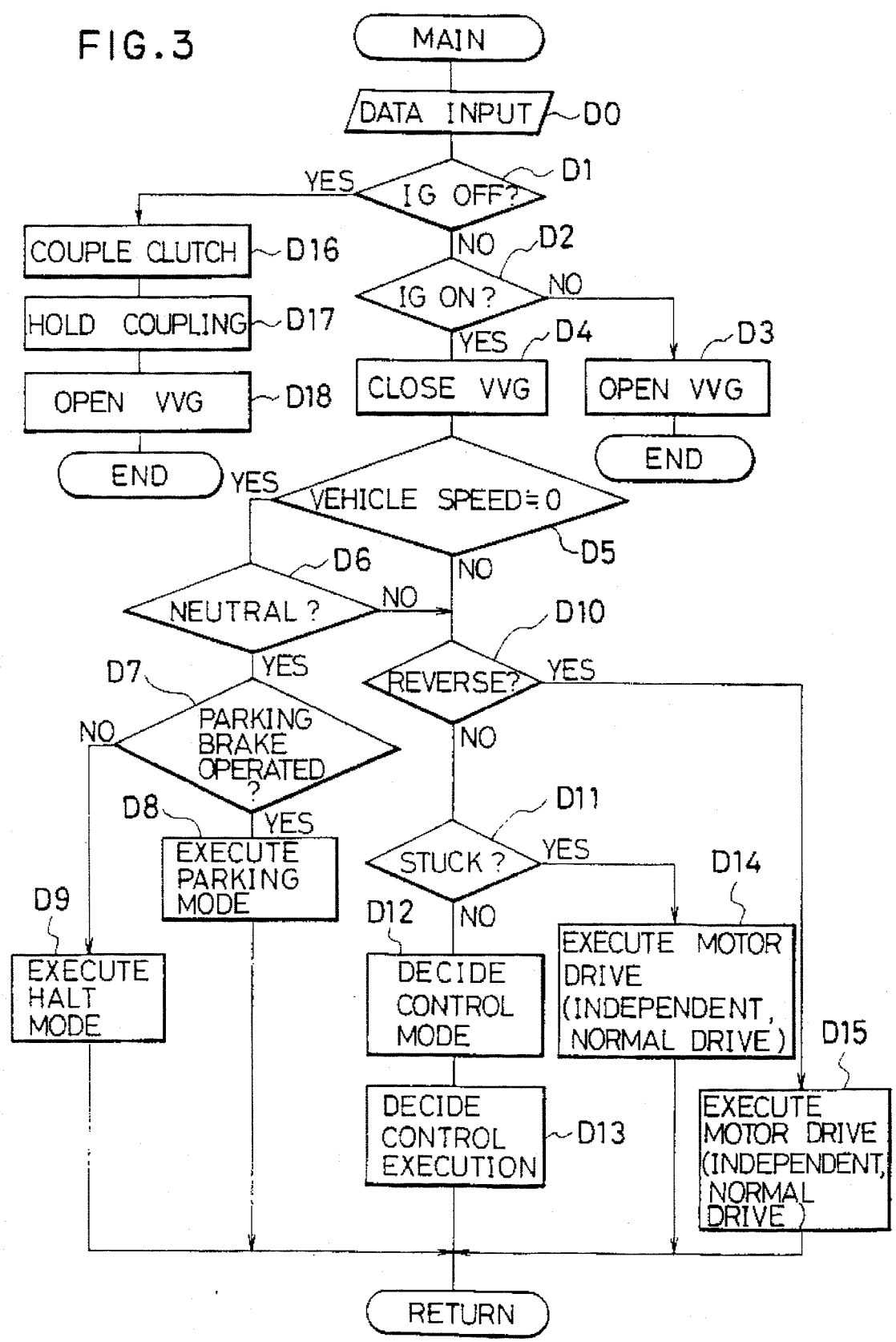

As shown in FIG. 3, signals from the various sensors and switches are entered at step D0, followed by proceeding to step D1 at which it is decided to determine if the ignition switch S11 is turned off. When it is decided that the ignition switch S11 is not turned off, then the program flow goes to step D2 at which it is decided to determine if the ignition switch S11 is turned on. If the result of decision at step D2 indicates that the ignition switch S11 is not turned on, then the program flow goes to step D3 at which the safety valve VVG is opened to thereby release the pressure within the high-pressure line 18. On the other hand, when it is decided at step D2 that the ignition switch S11 is turned on, then the safety valve VVG is closed at step D4 to thereby allow the high-pressure hydraulic pressure is to be fed to the high-pressure line 18.

Then, at step D5, it is decided to determine if the vehicle speed relative to the road is nearly zero. If the decision is YES, then the program flow goes to step D6 at which it is further decided to determine if the gear position of the transmission 4 is neutral. When it is decided at step D6 that the gear position of the transmission 4 is neutral, then it is additionally decided at step D7 to determine if the parking brake is being operated. When the result of decision at step D7 indicates that the parking brake is under operation, then the program flow goes to step D8 at which the control of the parking mode is executed. On the other hand, when it is decided at step D7 that the parking brake is not being operated, the halt mode is executed at step D9, followed by the return of the program flow.

If the decision at steps D5 and D6 gives the negative result, then the program flow goes to step D10 at which it is decided to determine if the gear position of the transmission 4 is set for the reverse driving. If the result of decision at step D10 indicates that the transmission 4 is not set for the reverse driving, then it is decided at step D11 to determine if the vehicle is stuck. The vehicle is determined as stuck, for example, when the accelerator pedal is depressed, the vehicle speed is set to nearly zero, and the speed of rotation of each of the left and right front wheels 1FL and 1FR is substantially higher than the vehicle speed of the vehicle. When the decision at step D11 gives the negative result, then the program flow goes to step D12 in order to determine in a manner as will be described hereinafter if the control conditions for executing the control modes other than the parking mode and the halt mode are satisfied. After step D12, the program flow goes to step D13 at which the control mode is executed or not executed by procedures as will be described hereinafter, followed by the return of the program flow.

When it is decided at step D10 that the transmission 4 is set for the reverse driving, then the program flow goes to step D15 at which the left hydraulic motor ML and the right hydraulic motor MR are subjected to normal driving at the independent mode, that is, at which the rear wheels 1RL and 1RR are driven in rearward direction with the left and right hydraulic motors ML and Mr, respectively. Further, when the result of decision at step D11 indicates that the vehicle is stuck, the left and right hydraulic motors ML and MR are subjected to reverse driving at independent mode, as in a manner as will be described hereinafter, in which the target vehicle speed of each of the left and right rear wheels 1RL and 1RR is set to be low (for example, as low as ca. 10 km per hour as a condition for releasing the stuck state of the vehicle). Thereafter, the program flow is returned.

Further, when it is decided at step D1 that the ignition (IG) switch is turned off, then the program flow goes to step D16 at which the clutch 16 is coupled, followed by proceeding to step D17 at which the coupled state of the clutch 16 is retained to thereby allow the change-over valve VVL to open both of the lines 62 and 63 and, thereafter, to step D18 at which the safety valve VVG is opened.

A detailed description will be made of step D12 in FIG. 3 with reference to flow charts as shown in FIGS. 4–7. These flow charts are prepared on the basis of the fact that the road surface on which the vehicle is running is not rough or bad.

Figure 4:
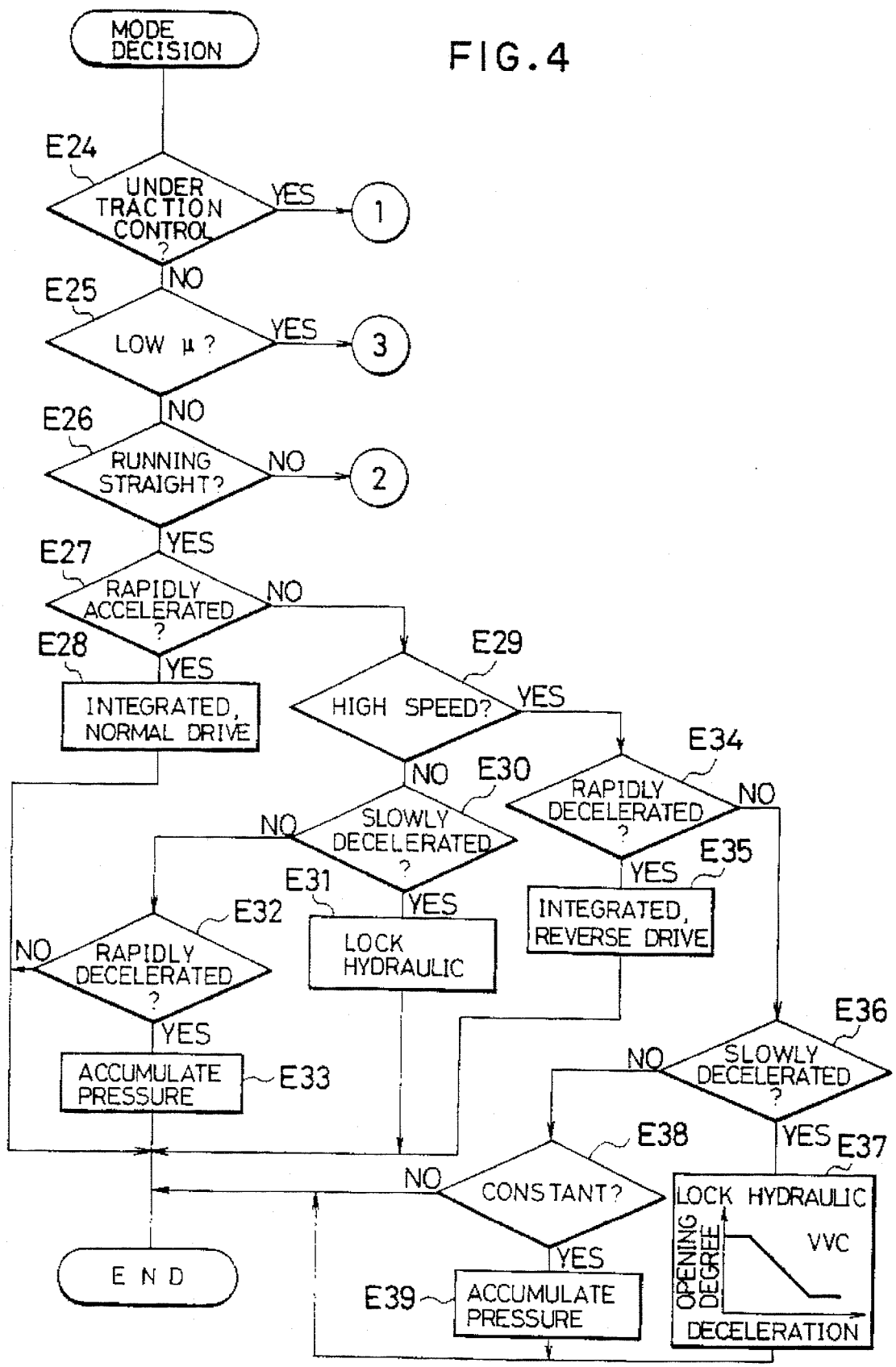

First, at step E24 in FIG. 4, it is decided to determine if the traction control by the control unit U3 is currently under process. If the result of this decision gives the negative result, then the program flow goes to step E25 in order to determine if the road surface has a low road surface friction coefficient $\mu$. When it is decided at step E25 that the road surface friction coefficient $\mu$ is low, then decision is made at step E26 to determine if the vehicle is running straight. In this embodiment, for example, the determination of the vehicle running straight is made by computing a lateral G (acceleration) on the basis of the steered angle of the steering wheel and the vehicle speed, and it is determined as "running straight" when the lateral G is lower than a predetermined value.

When it is decided at step E26 that the vehicle is running straight, then the processing is made at steps E27–E39. This processing is made on the basis of the fact that the road surface is flat, the road surface friction coefficient $\mu$ is high, and the vehicle is running straight. Eventually, it is decided to determine if the control conditions are met for executing the normal driving at the integrated mode (at step E28), the reverse driving at the integrated mode (at step E35), the hydraulic pressure-accumulating mode (at step E33) or the hydraulic pressure-locking mode (at steps E31, E37).

More specifically, as shown in FIG. 4, when it is decided at step E26 that the vehicle is running straight, then it is further decided at step E27 to determine if the vehicle is rapidly accelerated. When this decision is YES, then the program flow goes to step E28 at which the normal driving is conducted at the integrated mode, followed by the end of the program.

On the other hand, if it is decided at step E27 that the vehicle is not rapidly accelerated, then the program flow goes to step E29 at which the vehicle is running at a high speed. Then, at step E30, it is decided to determine if the vehicle is slowly decelerated when the decision at step E29 is NO. Thereafter, at step E31, the hydraulic pressure is locked when the result of decision at step E30 indicates that the vehicle is slowly decelerated, followed by the end of the program.

When it is decided at step E30 that the vehicle is slowly decelerated, then it is further decided at step E32 to determine if the vehicle is rapidly decelerated, followed by proceeding to step E33 at which the hydraulic pressure is accumulated in the accumulator 41 when the decision at step E32 is YES, on the one hand, and by the end of the program when the decision at step E32 is NO, on the other hand.

Further, when it is decided at step E29 that the vehicle is running at a high speed, then the program flow goes to step E34 at which it is decided to determine if the vehicle is rapidly decelerated. The reverse driving is conducted at the integrated mode at step E35 when the result of this decision is YES, followed by the end of the program. On the other hand, when the result of the decision at step E34, it is further decided to determine if the vehicle is slowly decelerated. Then, at step E37, the hydraulic pressure is locked by closing the variable orifices VVC in accordance with the relationship of their opening rates or rates with the extent of deceleration. Thereafter, the program ends.

On the other hand, when it is decided at step E36 that the vehicle is slowly decelerated, then it is decided at step E38 if the vehicle speed is constant. The hydraulic pressure is accumulated in the accumulator 42 when the vehicle speed is constant and the program ends when the vehicle speed is not constant.

It can be noted herein that the extent of acceleration and deceleration can be measured in known various manner. For example, the extent of acceleration can be determined on the basis of one of measurements, such as the magnitude of a speed at which the accelerator pedal is depressed, the amount of an increase in depression of the accelerator pedal, and the extent of acceleration of the vehicle body obtainable by differentiating the vehicle speed, or a combination thereof. On the other hand, the extent of deceleration can be determined on the basis of one of measurements, e.g. the magnitude of a speed at which the depression of the accelerator pedal is released, the magnitude of a speed of depression of the brake pedal, the amount of an increase in depression of the brake pedal, and the extent of deceleration of the vehicle body obtainable by differentiating the vehicle speed, or a combination thereof.

Figure 5:
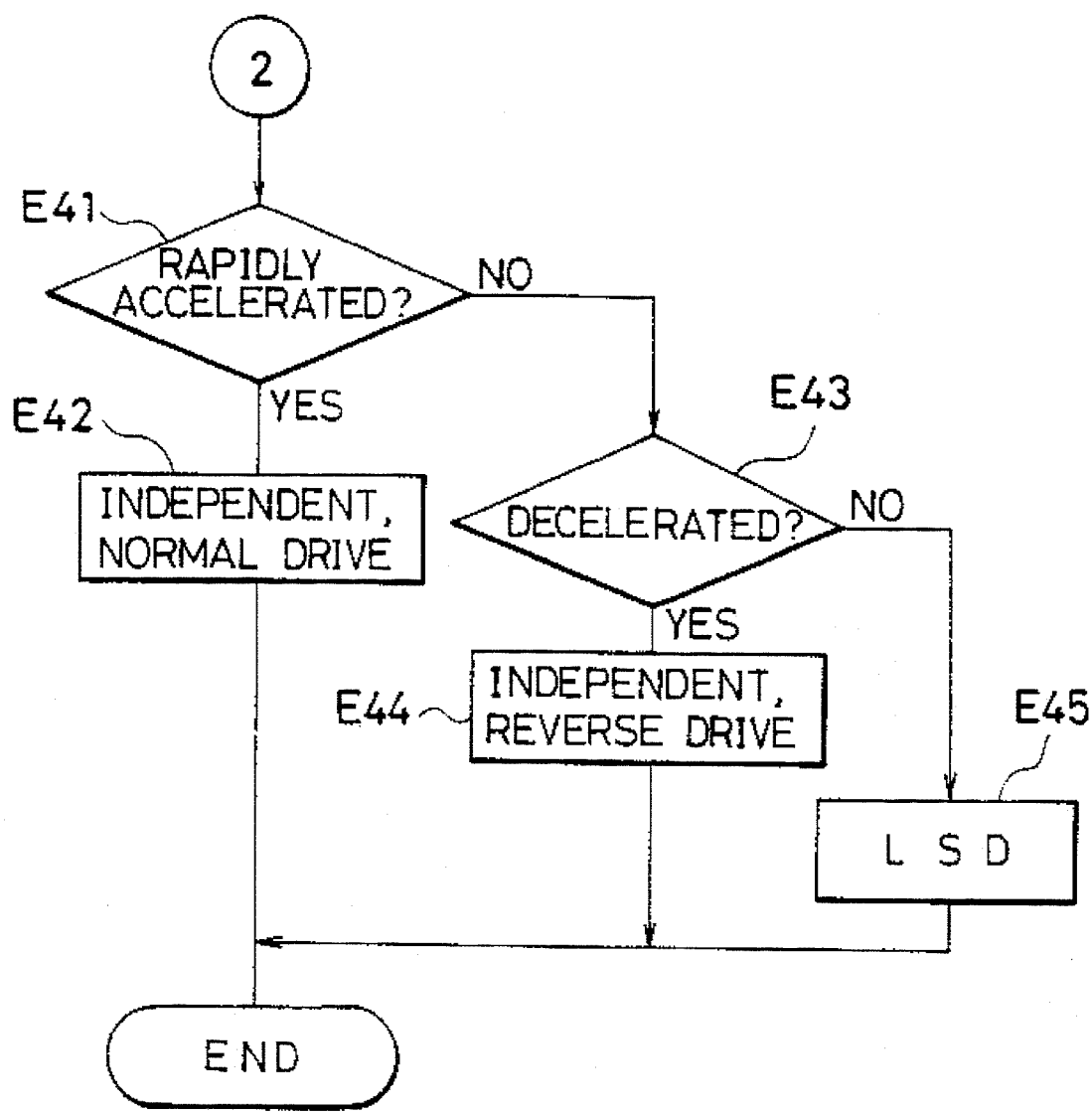

If it is decided at step E26 in FIG. 4 that the vehicle is not running straight, then the processing is made in accordance with the flow chart as shown in FIG. 5. The processing of FIG. 5 is made on the basis of the flat road, the high road surface friction coefficient $\mu$, and the cornering of the vehicle. Eventually, it is decided to determine if the control conditions are met for executing the normal driving at independent mode (at step E42), the reverse driving at independent mode (at step E44) and the LSD mode (at step E45).

More specifically, when it is decided at step E26 that the vehicle is running straight, then the program flow goes to step E41 at which it is further decided if the vehicle is rapidly accelerated. The normal driving is conducted at step E42 when this decision is YES, followed by the end of the program. On the other hand, it is further decided at step E43 if the vehicle is decelerated when this decision is NO. When the decision at step E43 is YES, the reverse driving is conducted at step E44, followed by the end of the program. Further, when the decision at step E43 is NO, then the LSD mode is executed at step E45, followed by the end of the program.

Figure 6:
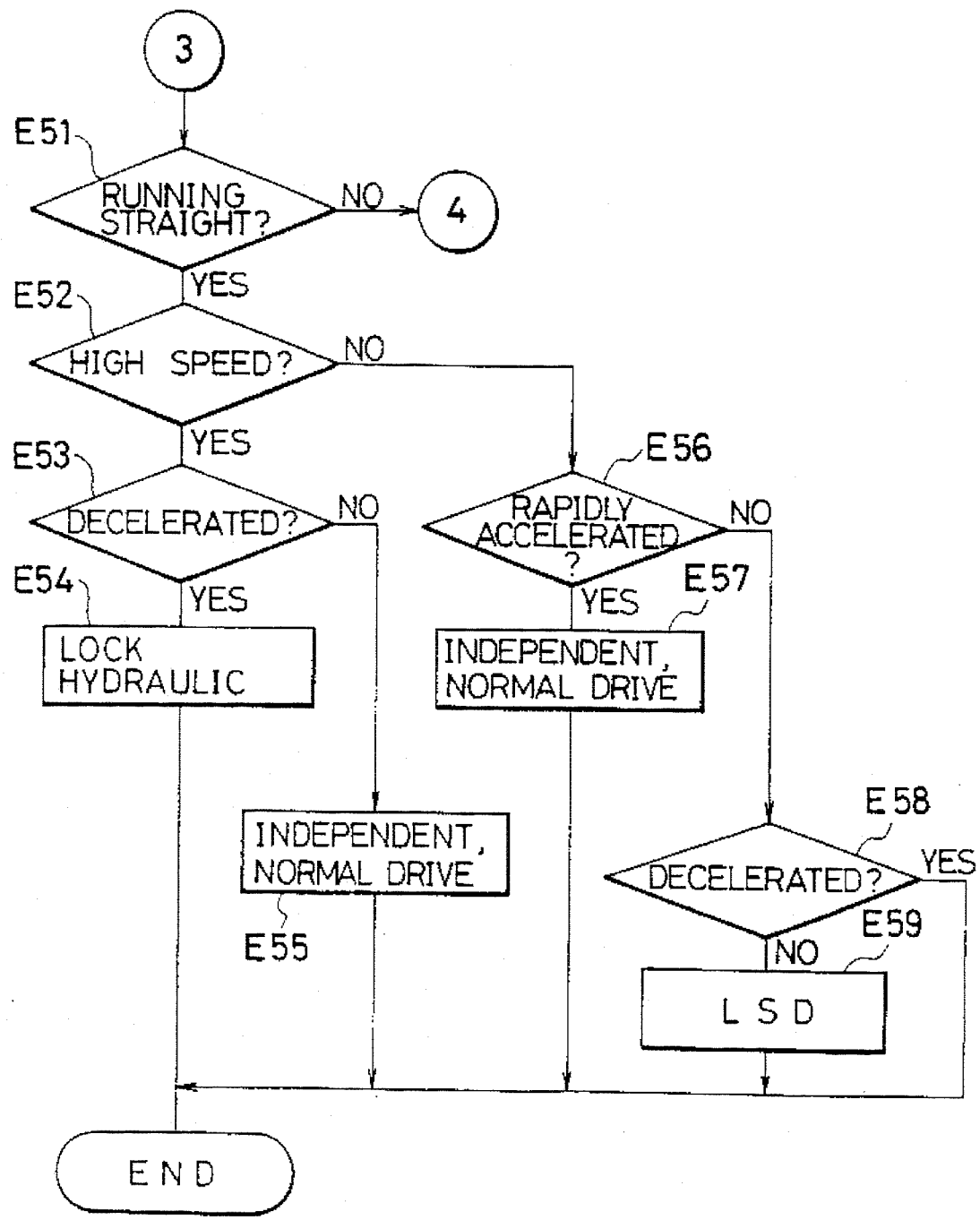

Further, when the result of decision at step E25 in FIG. 4 indicates that the road surface has a low road surface friction coefficient $\mu$, then the processing is made in accordance with the flow chart as shown in FIG. 6. In FIG. 6, it is decided at step E51 to determine if the vehicle is running straight, followed by executing the processing at steps E52-E59. This processing is based on the flat road, the low road surface friction coefficient $\mu$, and the straight running of the vehicle. Eventually, it is decided to determine if the control conditions are met for executing the normal driving at the independent mode (at step E55), the reverse driving at the independent mode (at step E57), the hydraulic pressure-locking mode (at step E65), and the LSD mode (at step E59).

Specifically, as shown in FIG. 6, when it is decided at step E51 that the vehicle is running straight, then the program flow goes to step E52 at which it is further decided if the vehicle is running at a high speed. When the result of this decision is YES, on the one hand, then it is further decided at step E53 to determine if the vehicle is decelerated and, when the result of this decision is NO, on the other hand, then it is further decided at step E56 to determine if the vehicle is rapidly accelerated. The hydraulic pressure-locking mode is executed at step E54 when the decision at step E53 is YES. Thereafter, the program ends. On the other hand, the normal driving is conducted at the independent mode at step E55 when the decision at step E53 is NO, followed by the end of the program. Further, when the decision at step E56 is YES, then the normal driving is conducted at the independent mode at step E57, followed by the end of the program. On the other hand, when the result of the decision at step E56 is NO, then it is further decided at step E58 to determine if the vehicle is decelerated. If the result of this decision is NO, then the LSD mode is executed at step E59, followed by the end of the program. If the result of the decision at step E58 is YES, then the program flow ends.

Figure 7:
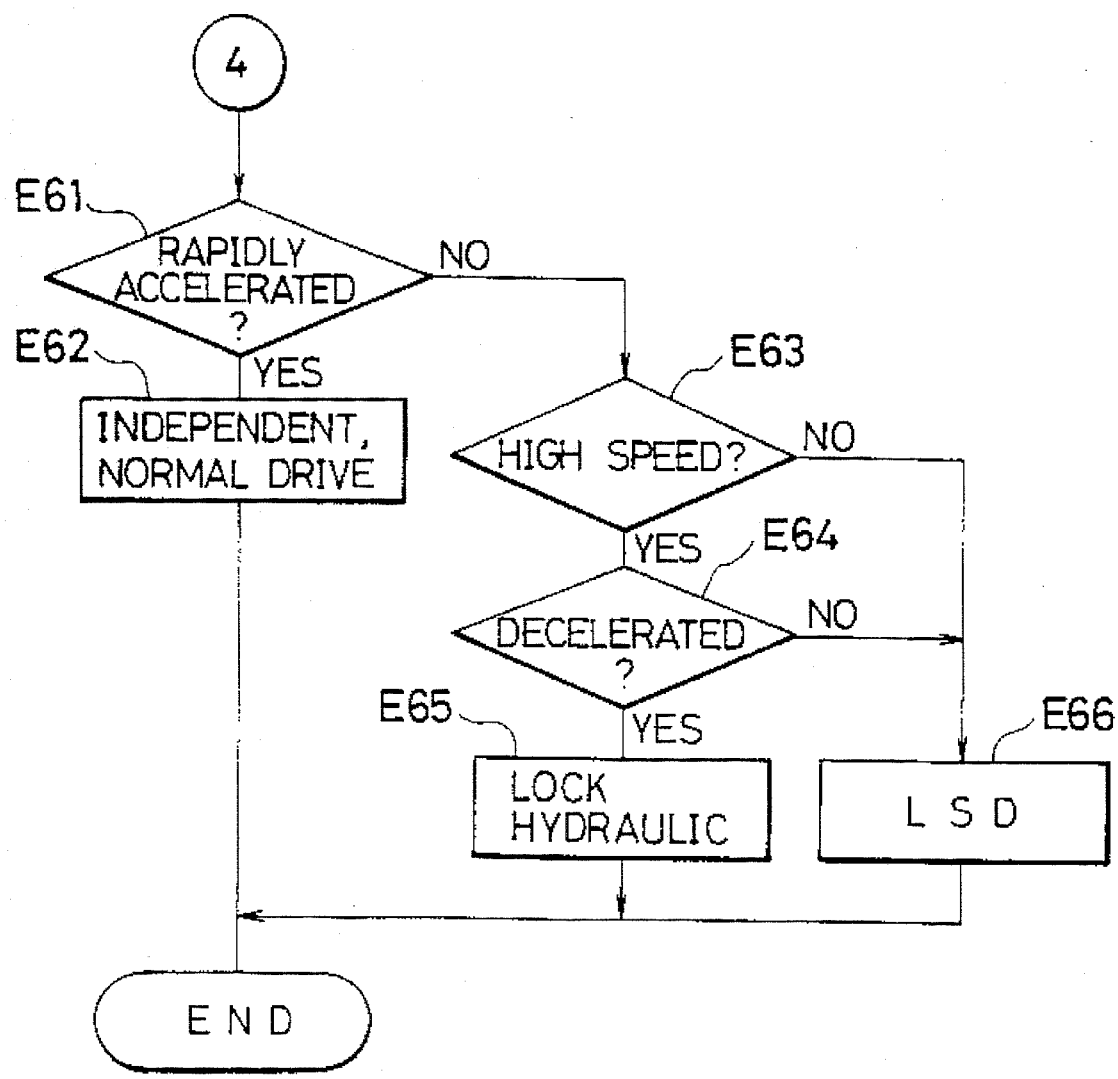

Furthermore, when it is decided at step E51 in FIG. 6 that the vehicle is not running straight, then the processing is made in accordance with the flow chart as shown in FIG. 7. This processing is made on the basis of the flat road, the low road surface friction coefficient μ and the cornering of the vehicle. Eventually, it is decided to determine if there are met the control conditions for executing the normal driving at the independent mode (at step E62), the hydraulic pressure-locking mode (at step E65) and the LSD mode (at step E66).

As shown in FIG. 7, it is further decided at step E61 to determine if the vehicle is rapidly accelerated when the result of the decision at step E51 indicates that the vehicle is not running straight. When the result of decision at step E61 is YES, then the normal driving is conduct at the independent mode at step E62, followed by the end of the program, on the one hand, and it is further decided at step E63 if the vehicle is running at a high speed, on the other hand. Further, when the result of decision at step E63 is YES, then the program flow goes to step E64 at which it is further decided if the vehicle is decelerated and then to step E65 to execute the hydraulic pressure-locking mode, followed by the end of the program. On the other hand, when the result of decision at step E63 or E64 is NO, then the LSD mode is executed at step E66, followed by the end of the program.

Figure 8:
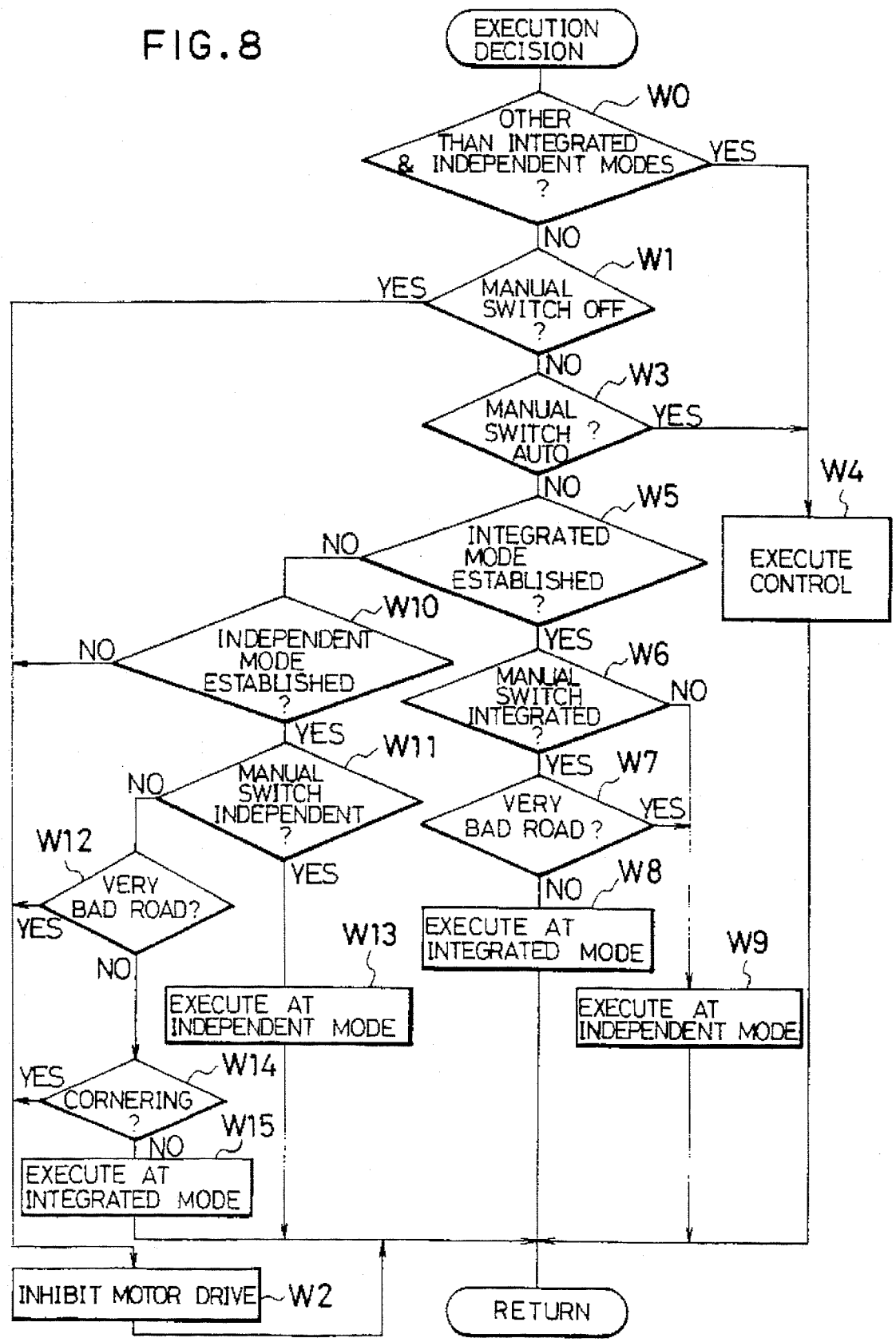

In addition, the details of the control at step D13 in FIG. 3 are described with reference to the flow chart as shown in FIG. 8. The processing in FIG. 8 is made in order to execute or fail to execute the modes satisfying the control condition as shown in FIGS. 4–7.

First, at step W0, it is decided to determine if the control condition is met for executing the control mode other than the integrated mode and the independent mode. When the decision at step W0 gives the affirmative result, then the program flow goes to step W4 at which the control mode (the LSD mode, hydraulic pressure-locking mode or hydraulic pressure-accumulating mode) is executed which has satisfied the control conditions as described hereinabove.

When the result of decision at step W0 indicates that no control mode other than the integrated mode and the independent mode is met, then the program flow goes to step W1 at which the manual switch S13 is turned off. If the result of decision at step W1 is YES, then the program flow goes to step W2 at which the driving by the motors ML and MR is inhibited because the driver does not intend to drive the motors ML and MR, followed by the return of the program flow.

On the other hand, when the result of the decision at step W1 indicates that the manual switch S13 is not turned off, then the program flow goes to step W3 at which it is decided to determine if the manual switch S13 is set to "AUTO" mode. When the result of this decision is YES, the control mode is executed at step W4, which satisfies the control conditions, including the driving of the motors ML and MR. Then, the program flow is returned.

If the result of decision at step W3 indicates that the manual switch S13 is not set to AUTO mode, then the program flow goes to step W5 at which it is further decided to determine if the control conditions for the integrated mode are met. When the result of this decision is YES, then it is decided at step W6 if the manual switch S13 is set to "INTEGRATED" mode. If the result of decision at step W6 indicates that the manual switch S13 is set to "INTEGRATED" mode, it is then decided at step W7 to determine if the road condition is extremely bad. If the result of decision at step W7 is NO, then the motors ML and MR are driven at the integrated mode at step W8.

On the other hand, when the result of decision at step W6 is NO or the result of decision at step W7 is YES, then the program flow goes to step W9 at which the motors ML and MR are driven at the independent mode.

If the result of decision at step W5 indicates that no control conditions for the integrated mode are met, then the processing at steps W10–W15 is executed. This processing corresponds to the processing at steps W6–W9. More specifically, it is decided at step W10 to determine if the control conditions for the independent mode are met. When the result of decision at step W10 is YES, then it is decided at step W11 to determine if the manual switch S13 is set to "INDEPENDENT" mode and, when the result of this decision is YES, then the program flow goes to step W13 at which the motors ML and MR are driven at the independent mode, followed by the return of the program flow.

Furthermore, when the decision at step W11 indicates that the manual switch S13 is not set to the independent mode, then the program flow goes to step W12 at which it is further decided to determine if the road condition is very bad and to step W14 at which it is further decided to determine if the vehicle is cornering when the result of the decision at step W12 is NO. Then, at step W15, the motors ML and MR are driven at the integrated mode when the result of the decision at step W14 is NO, followed by the return of the program flow.

Then, a description will be made of the details of the control over the normal driving of the motors ML and MR at the independent mode with reference to FIG. 9. It can be noted herein that the control over the normal driving thereof at the independent mode is substantially the same as the normal driving thereof at the integrated mode with the exception that the left and right rear wheels 1RL and 1RR are set to the same target vehicle speeds.

In FIG. 9, after data, such as, for example, the vehicle speed VA relative to the road surface and the wheel speeds VB-L and VB-R, was entered at step Z1, the program flow goes to step Z2 at which a target vehicle speed VTR is set for each of 1st speed range, 2nd speed range, 3rd speed range, 4th speed range, and 5th speed range, on the basis of the rate of opening of the accelerator and the shift position of the transmission 4 as parameters.

Then, at step Z3, it is decided to determine if the value obtained by subtracting the actual wheel speed VB-L of the left rear wheel 1RL from the target vehicle speed VTR is equal to or larger than a predetermined speed V1. When the result of this decision is NO, it is determined that the normal driving is not necessary, followed by proceeding to step Z14 at which the normal driving is suspended and then by the return of the program flow. The processing at steps Z3 and Z14 is likewise executed for the right rear wheel 1RR independently from the left rear wheel 1RL. It is to be noted herein that, although the predetermined speed V1 is set as a value indicative of the extent of a slip sufficiently high for acceleration, it may be constant or variable as being larger as the vehicle speed VA becomes higher.

When it is decided at step Z3 that the value obtained by subtracting the actual wheel speed VB-L of the left rear wheel 1RL from the target vehicle speed VTR is equal to or larger than the predetermined speed V1, then the program flow goes to step Z4 at which it is decided to determine if the accelerator is fully closed. When the result of decision at step Z4 is YES, the driving by means of the motors ML and MR is not required. Hence, the program flow goes to step Z14 at which the normal driving of the left and right rear wheels 1RL and 1RR is suspended.

On the other hand, when the decision at step Z4 is NO, the program flow goes to step Z5 at which the lateral G (acceleration) acting upon the vehicle body is computed on the basis of the vehicle speed VA and the steered angle of the steering wheel. Thereafter, at step Z6, correction coefficients K1 and K2 are set relative to the lateral G. Then, at step Z7, the decision is made to determine if the vehicle is cornering to the right. When the result of this decision is YES, the target wheel speed VTRL of the left rear wheel 1RL is computed by multiplying the target vehicle speed VTR decided at step Z2 with the correction coefficient K1. Likewise, at step Z9, the target wheel speed VTRR of the right rear wheel 1RR is computed by multiplying the target vehicle speed VTR decided at step Z2 with the correction coefficient K2.

On the other hand, when it is decided at step Z7 that the vehicle is not cornering to the right, then the program flow goes to step Z8 at which the target wheel speeds VTRL and VTRR of the left and right rear wheels 1RL and 1RR are computed, respectively. In summary, the processing at steps Z6 to Z9 is adapted to make the target wheel speed of the wheel located at the outer side of cornering faster while making the target wheel speed of the wheel located at the inner side thereof slower. However, when the vehicle is running straight, the result of decision at step Z7 indicates that vehicle is not cornering to the right, followed by proceeding to step Z8. At this time, the correction coefficients K1 and K2 are set to "1" so that the lateral G is set to zero or nearly zero, and the target wheel speeds VTRL and VTRR of the left and right rear wheels 1RL and 1RR are equal to each other.

After step Z8 or Z9, the program flow goes to step Z10 at which the flow rate Q of oil to be fed to each of the motors ML and MR is determined in accordance with the value obtainable by subtracting the actual wheel speeds VBL and VBR from the target wheel speeds VTRL and VTRR, respectively. The oil flow rate Q is determined discretely and separately for each of the left and right motors ML and MR, followed by proceeding to step Z11 at which the change-over valves VVB-L and VVB-R are controlled independently and separately to realize the oil flow rate Q determined at step Z10.

Then, at step Z12, it is decided to determine if the value obtained by subtracting the actual wheel speed VBL of the left rear wheel 1RL from the vehicle speed VA is smaller than a predetermined speed "−V2". The decision at step Z12 is so adapted as to determine if the actual wheel speed VBL of the left rear wheel 1RL is too high as compared with the vehicle speed VA. When the result of decision at step Z12 is YES, then the program flow goes to step Z13 at which the oil flow rate Q to be fed is "minus"-corrected to become smaller in order to allow the rear wheels to maintain their predetermined slip values, followed by the return of the program flow. It can be noted herein that the processes at step Z12 and Z13 are executed likewise for the right rear wheel 1RR. On the other hand, when the result of decision at step Z12 is NO, the program flow is returned without processing at step Z13.

In the control of the normal driving at the integrated mode, the processes from step Z5 to step Z9 are not required to be executed, and the target vehicle speed VTR determined at step Z2 is set as the target wheel speeds VTRL and VTRR for the left and right rear wheels 1RL and 1RR, respectively. The change-over valve VVA is employed for realizing the oil flow rate Q at step Z11.

Figure 10:
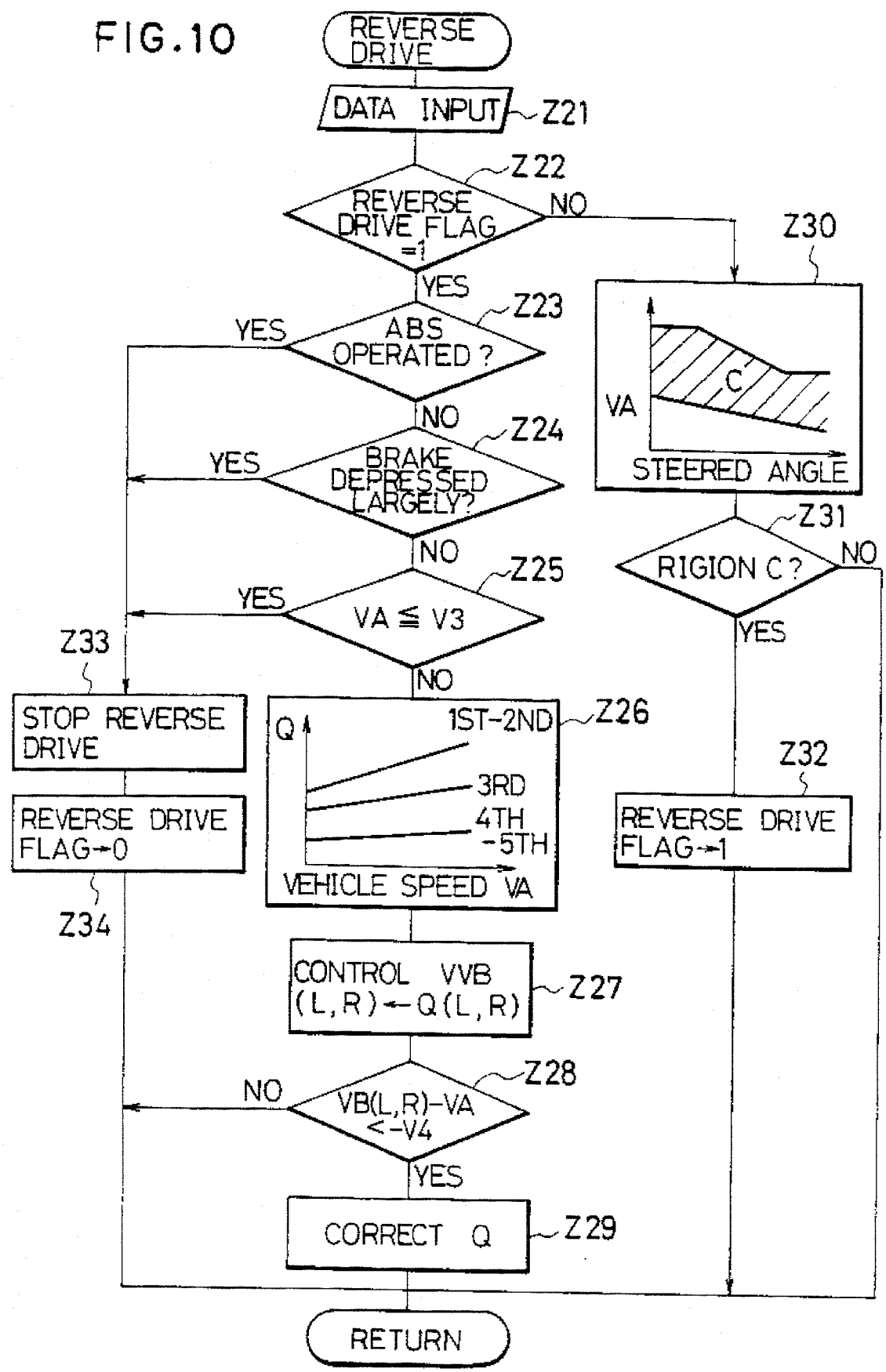

Then, the details of the reverse driving at the independent mode are described with reference to FIG. 10. The reverse driving at the independent mode is conducted in substantially the same manner as the normal driving at the independent mode with the exception that the change-over valve to be employed in this reverse driving at the independent mode is different from the change-over valve to be employed for the adjustment of the flow rate in the normal driving at the integrated mode.

First, at step Z21, data is entered, followed by proceeding to step Z22 at which it is decided to determine if the reverse driving flag is set to "1". If the result of decision at step Z22 is NO, then it is confirmed at step Z30 where the vehicle currently is located in a hatched region "C" preset by employing the steered angle of the steering wheel and the vehicle speed VA as parameters. Thereafter, at step Z31, it is decided to determine if the current status of the vehicle exists in the hatched region "C" set at step Z30. When the result of this decision is YES, then the program flow goes to step Z32 at which the reverse driving flag is set to "1", followed by returning. On the other hand, when the result of decision at step Z31 is NO, then the program flow is returned without processing at step Z32.

When the program flow passes step 32, the result of decision at step Z22 is YES. In this case, the program flow proceeds to step Z23 at which it is decided to determine if the vehicle is currently under ABS control. When this decision gives the negative result, then the program flow goes to step Z24 at which it is further decided to determine if the amount of depression of the brake is large. If the result of this decision is NO, then the program flow goes to step Z25 at which it is decided to determine if the vehicle speed VA is as slow as a predetermined speed "V3" or slower.

When it is decided at step Z25 that the vehicle speed VA is as slow as a predetermined speed "V3" or slower, then the program flow goes to step Z26 at which the flow rate Q to be fed to the motors ML and MR is determined by employing the vehicle speed VA and the shift position (1st-2nd speed range, 3rd speed range, and 4th-5th speed range) of the transmission 4 as parameters. Thereafter, at step Z27, the change-over valves VVB-L and VVB-R are controlled, respectively, to supply the oil to the left and right motors ML and MR at the flow rates Q(L, R) determined at step Z26. After step Z27, it is decided at step Z28 to determine if the value obtained by subtracting the vehicle speed VA from the actual wheel speeds VB(L, R) of the left rear wheel 1RL and the right rear wheel 1RR, respectively, is smaller than a predetermined speed "−V4". If this decision is YES, then the program flow goes to step Z29 at which the flow rate Q is "minus"-corrected in order to keep its predetermined slip value, followed by the return of the program flow. The processes at steps Z28 and Z29 correspond to the steps Z12 and Z13 in FIG. 9, respectively, and they are executed to make correction to the extent that the reverse driving force is not rendered too large.

On the other hand, when the process at each of steps Z23, Z24 and Z25 gives the affirmative result, then the program flow goes to step Z33 at which the reverse driving is suspended, followed by proceeding to step Z34 at which the reverse driving flag is reset to zero and by the return of the program flow.

It can be noted herein that the reverse driving at the integrated mode employs the change-over valve VVA for realizing the flow rate Q determined at step Z26.

Figure 11:
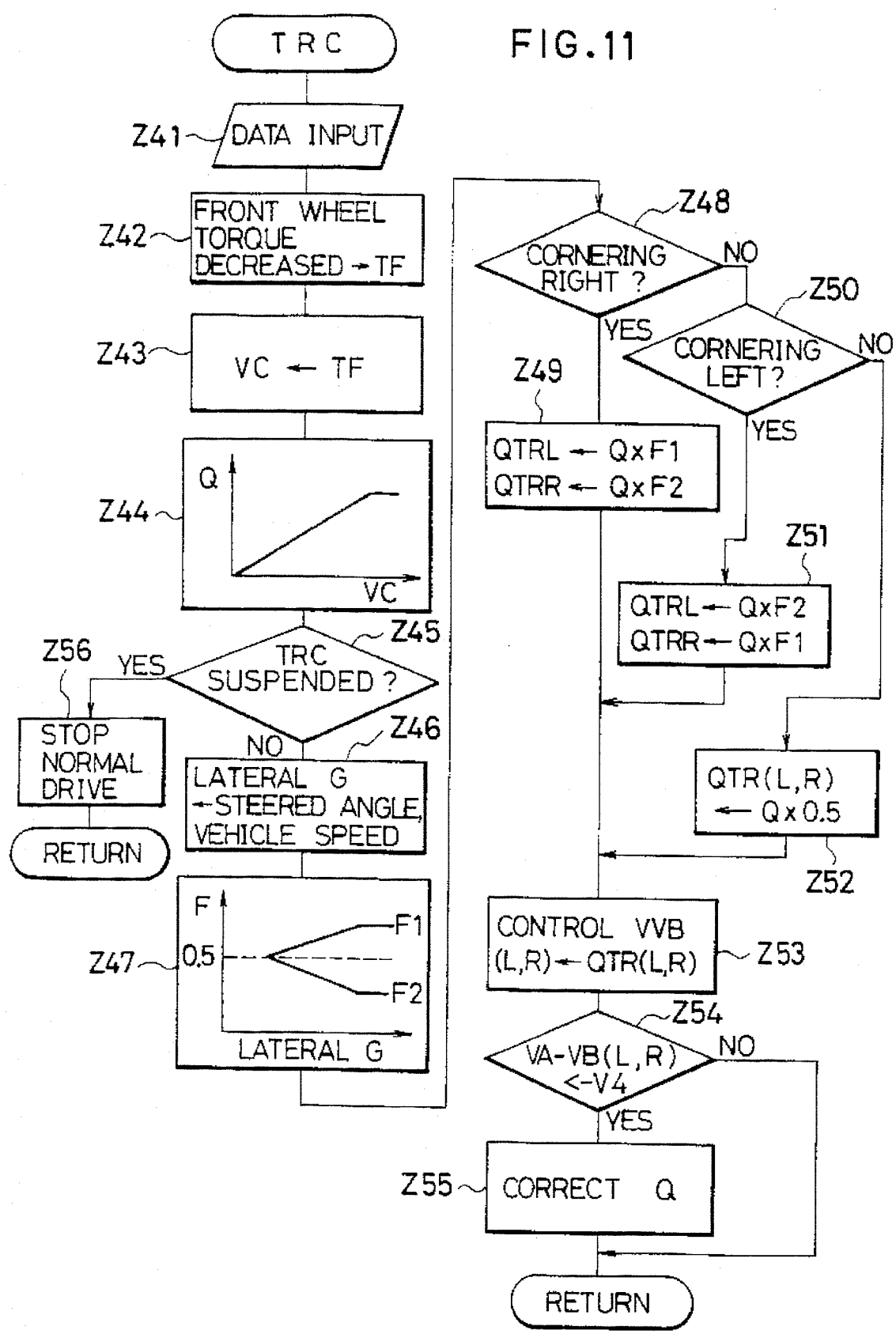

Further, a description will be made of the execution of the traction control by the control unit U3 with reference to FIG. 11. This processing is executed when the result of the decision at step E24 in FIG. 4 indicates that the traction control by the control unit U3 is currently under process. This processing as shown in FIG. 11 is so adapted as to control the normal driving of the motors ML and MR to be made discretely and separately when the traction control is currently executed by the control unit U3.

First, at step Z41, data is entered, followed by proceeding to step Z42 at which the amount or rate of a decrease in the torque applied to the left and right front wheels 1FL and 1FR, to be caused by the traction control by the control unit U3, that is, the amount or rate TF of a decrease in the torque generated by the engine 2, is read on the basis of the signal from the control unit U3. Thereafter, at step Z43, an amount or rate VC of a decrease in the vehicle speed is determined in order to comply with the decreased amount or rate TF.

Then, at step Z44, the flow rate Q to be fed to the motors ML and MR is determined in accordance with the amount or rate VC of the decrease in the vehicle speed. The flow rate Q can be determined in order for the sum of the generated torque to become equal to the amount or rate of the decrease of the torque generated by the engine 2. Thereafter, at step Z45, it is decided to determine if the traction control (TRC) is suspended. When the traction control is suspended, then the program flow goes to step Z56 at which the normal driving is suspended, followed by the return of the program flow.

On the other hand, when the result of decision at step Z45 is NO, then the processes at steps Z46–Z52 are executed. This processing is so adapted as to determine the flow rates QTRL and QTRR for the left and right rear wheels 1RL and 1RR, that is, a ratio of distribution of the torque. In other words, correction coefficients F1 and F2 are determined at step Z47 in accordance with the lateral G. After step Z47, it is decided at step Z48 if the vehicle is cornering to the right and, when this decision is YES, then the flow rates QTRL and QTRR of the hydraulic liquid to be supplied to the rear wheel 1RL and 1RR are computed by multiplying the flow rate Q with the correction coefficients F1 and F2, respectively. On the other hand, when the result of the decision at step Z48 is NO, then it is further decided if the vehicle is cornering to the left. When the result of this decision is YES, then the program flow goes to step Z51 at which the flow rates QTRL and QTRR of the hydraulic liquid to be supplied to the rear wheel 1RL and 1RR are computed by multiplying the flow rate Q with the correction coefficients F2 and F1, respectively. In other words, at steps Z49 and Z51, the rate of distribution of the torque to the rear wheel located at its outer side of cornering is made larger than the rate of distribution of the torque to the rear wheel located at its inner side thereof, when the vehicle is cornering. On the other hand, when it is decided at step Z50 that the vehicle is not cornering to the left, i.e. when the vehicle is running straight, then the flow rates QTR(L, R) are computed by multiplying the flow rate with 0.5. In other words, the rate of distribution of the torque to the rear wheel located at its outer side of cornering is made equal to the rate of distribution of the torque to the rear wheel located at its inner side thereof.

After step Z49, Z51 or Z52, the processing at steps Z53 to Z55 is executed. This processing corresponds respectively to steps Z11 to Z13 in FIG. 9; hence, a duplicate description is omitted from the description which follows, in order to avoid duplication in explanation.

Figure 12:
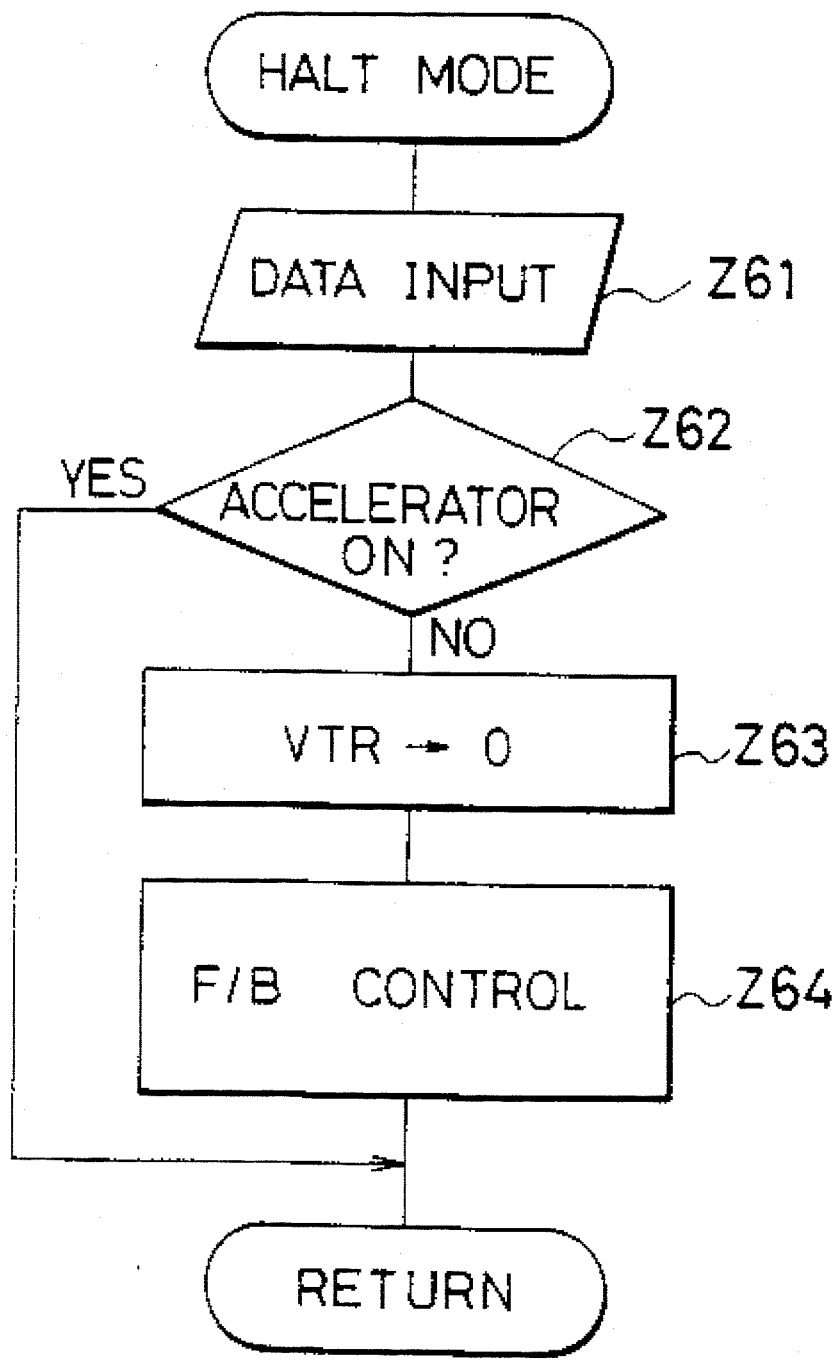

Now, a description will be made on the control at the halt mode at step D9 in FIG. 3, with reference to FIG. 12. First, at step Z61, data is entered, followed by proceeding to step Z62 at which it is decided to determine if the accelerator is depressed. If the result of decision at step Z62 is NO, on the one hand, the target vehicle speed VTR is set to zero at step Z63, followed by proceeding to step Z64 at which the flow rates to the motors ML and MR are subjected discretely and separately to feedback control in order to allow each of the actual wheel speed VBL and VBR of the respective left and right rear wheels 1RL and 1RR to become the target vehicle speed VTR. Thereafter, the program flow is returned. On the other hand, when it is decided at step Z62 that the accelerator is turned on, then the program flow is returned.

In instances where the transmission 4 is of automatic type in which the clutch 3 is replaced with a torque converter, the vehicle is so arranged as to run at a very slow speed, as called "creep". If the target vehicle speed VTR is set to, for example, 5 km per hour, the vehicle can run constantly at a so-called "creep" speed, regardless of an angle of inclination of the road on which the vehicle halts. Further, the transmission 4 may be of a continually variable type or of a non-stepwise variable type, which can, for example, manually change the target vehicle speed VTR in a speed range of from 0 to 15 km per hour. In the event where the target vehicle speed VTR is 0 km per hour, the vehicle does not of course run at a creep speed.

It is to be noted herein that the present invention can achieve the following actions or functions, in addition to those as described hereinabove.

a. If the mode (the integrated mode or the independent mode) selected by the manual switch S13 would be different from the mode (the integrated mode or the independent mode) in which the control conditions are established at step D12 in FIG. 3 (as specifically shown in FIGS. 4–7), the motors ML and MR may not be driven.

b. Even when the vehicle is running on a road having bad road conditions, the motors ML and MR may be driven in substantially the same manner as the vehicle is running on a road having good road conditions.

c. A region for executing the control at the integrated mode and the independent mode so as to comply with a road having bad road conditions may be set prior to the selection of the mode with the manual switch S13.

Further, the control at the independent mode only may be allowed to be made when the vehicle is running on a road having very bad road conditions, while the control at the integrated mode may be allowed to be made when it is running on a road having bad, not very bad, road conditions. Conversely, the control at the integrated mode only may be allowed to be made when the vehicle is running on such a road having very bad road conditions, while the control at the independent mode may be allowed to be made when it is running on such a road having bad, not very bad, road conditions.

d. The left and right rear wheels 1RL and 1RR may be drivable with the engine 2 and the left and right front wheels 1FL and 1FR may be drivable with the motors ML and MR, respectively. As a matter of course, each of the motors ML and MR is of an electrically drivable type. Furthermore, the motors ML and MR may be so arranged as to be always driven while the vehicle is running.

e. While the vehicle is running straight, the vehicle is controlled at the independent mode at the time of running at a slow speed, at the one hand, and at the integrated mode at the time of running at a high speed, on the other hand. Such setting may be made while the vehicle is running on a road, in particular having a low road surface friction coefficient μ, although it can be made while it is running on a road having a high road surface friction coefficient μ. This arrangement can achieve improvements in drivability at a low speed as well as stability in running straight at a high speed.

Figure 13:
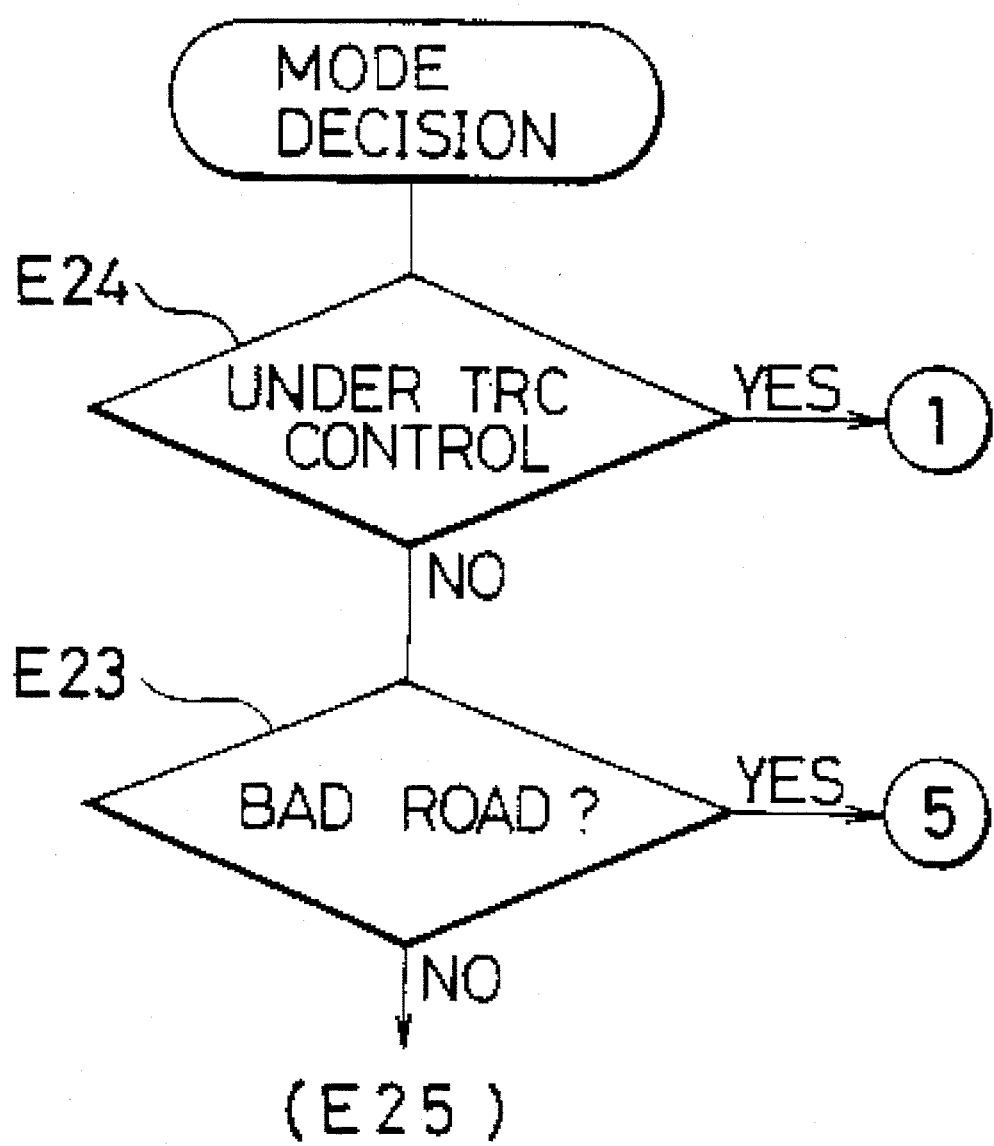
Figure 14:
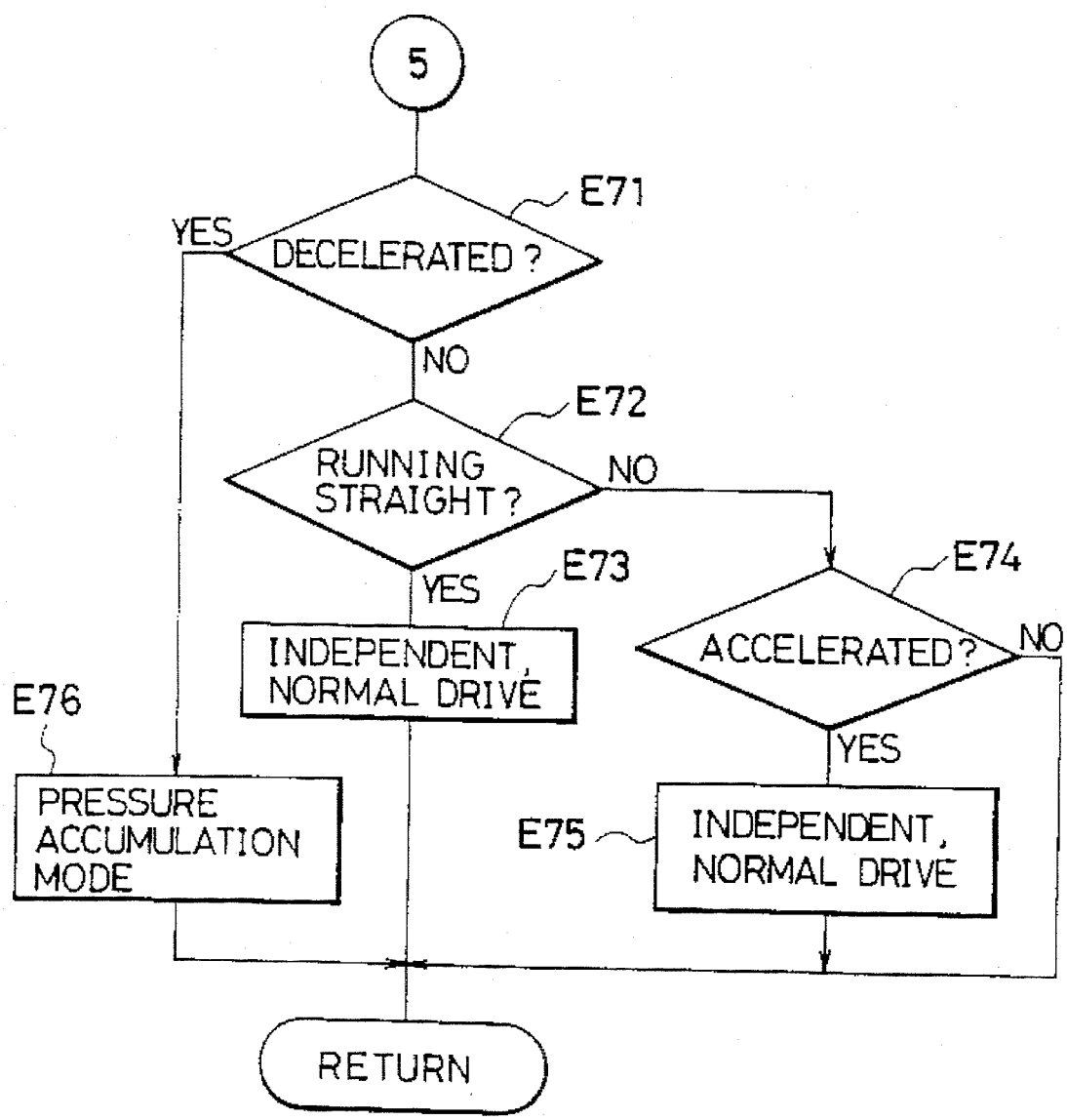
Figure 15:
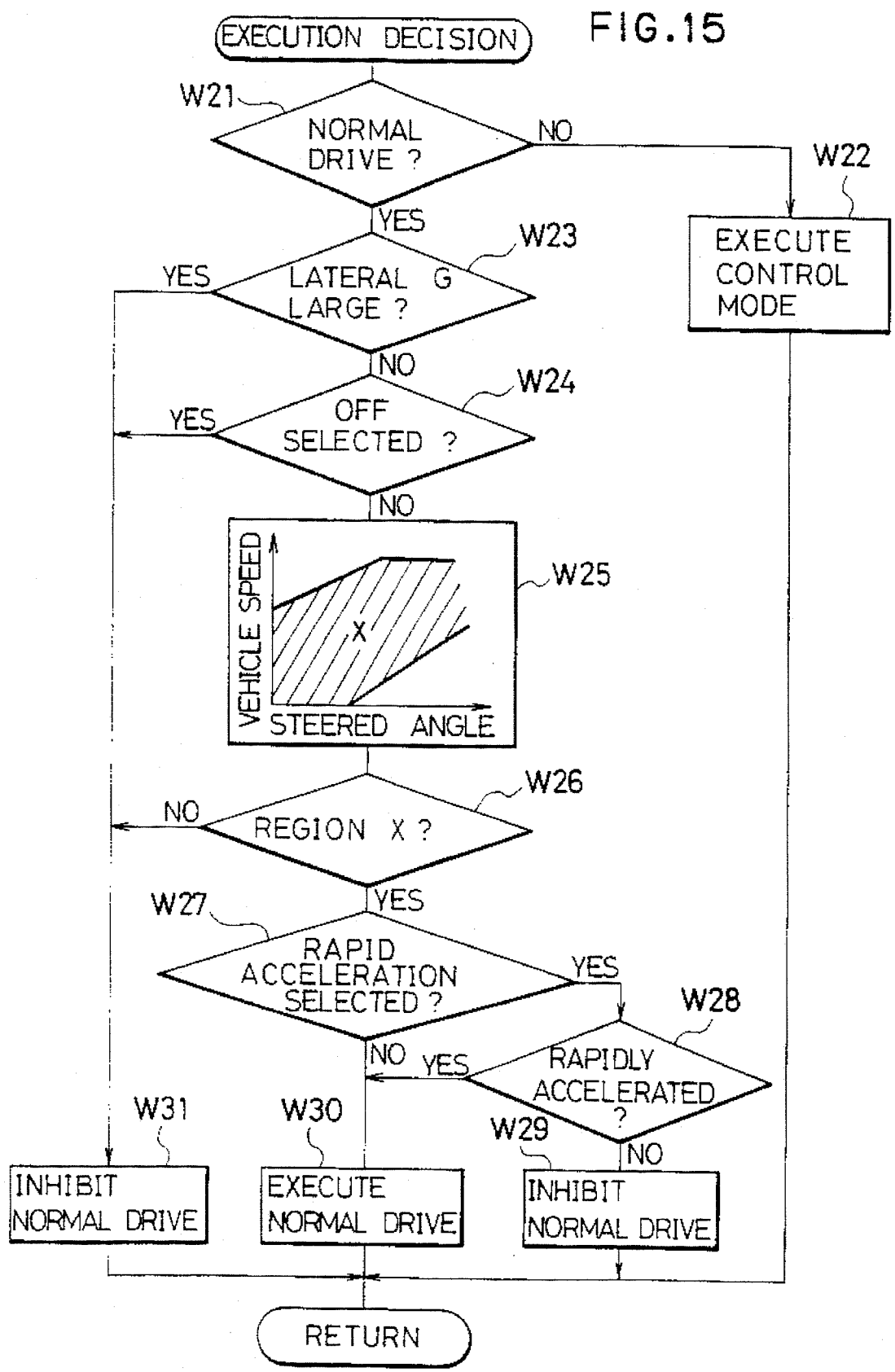

FIGS. 13–15 are directed to another embodiment of the present invention, which indicates an example of modification of a region in which the motors ML and MR are driven. FIGS. 13–15 indicate in particular the additions to or modifications of FIGS. 1–12.

In this embodiment, a sensor S15 and a switch S16 are replaced with the sensor S13 as shown in FIG. 2. The sensor S15 is so adapted as to sense a lateral G (acceleration) acting laterally upon the vehicle body, and the switch S16 is so adapted as to select or change a region in which the motors ML and MR are driven manually, that is, a region in which the mode for executing the normal driving is executed. In this embodiment, there is selected one of the three modes, i.e. "OFF" mode at which the normal driving is forcibly inhibited, "AUTO" mode at which the execution of the normal driving is automatically selected, and "RAPID ACCELERATION" mode at which the normal driving is executed only when the vehicle should be rapidly accelerated.

In this embodiment, as shown in FIG. 13, step E23 for determining a bad road surface is inserted between steps E24 and E25 in FIG. 4; FIG. 14 is a flow chart for determining such a bad road surface; and a flow chart for making an execution decision as shown in FIG. 8 is replaced with the flow chart as shown in FIG. 15.

The description as made hereinabove is directed to those which differ in this embodiment from the first embodiment as described hereinabove.

Specifically, when it is decided at step E24 in FIG. 13 that the vehicle is currently under traction control, then the program flow is subjected to processing at steps E71 et seq, in which the control mode is determined at the time of running in a bad road condition. However, in this case, the region or condition for executing the normal driving at the independent mode in such a bad road condition is further expanded or extended more than when executing the normal driving at the independent mode in a good road condition.

More specifically, when it is decided at step E23 in FIG. 13 that the road condition is bad, then the program flow goes to step E71 at which it is decided to determine if the vehicle is decelerated. When the result of decision indicates that the vehicle is decelerated, then it is decided at step E72 to determine if the vehicle is running straight. If the decision at step E72 gives the affirmative result, then the program flow goes to step E73 at which the normal driving is executed at the independent mode, followed by the return of the program flow. On the other hand, when it is decided at step E72 that the vehicle is not running straight, then the program flow goes to step E74 at which it is further decided to determine if the vehicle is accelerated. If the result of decision at step E74 is YES, then the vehicle is subjected to normal driving at the independent mode, followed by the return of the program flow. On the other hand, if it is decided at step E74 that the vehicle is not accelerated, then the program flow is returned. Furthermore, if it is decided at step E71 that the vehicle is decelerated, then the hydraulic pressure-accumulating mode is set at step E76, followed by the return of the program flow.

The process at step D13 in FIG. 3 is specifically indicated in FIG. 15 which further limits the region for executing the normal driving.

As shown in FIG. 15, it is decided at step W21 to determine if the result of decision at step D12 in FIG. 3 indicates that the normal driving is executed. If the decision at step W21 gives the negative result, then the program flow goes to step W22 at which there is executed the control mode decided at step D12, that is, the control mode other than the normal driving at the hydraulic pressure-accumulating mode or the like.

On the other hand, if the decision at step W21 gives the affirmative result, then it is decided at step W23 to determine if the actual lateral G sensed by the sensor S15 is equal to or larger than a predetermined value. If the result of decision at step W23 is YES, then the program flow proceeds to step W31 at which the execution of the normal driving is inhibited. In this case, the inhibition of the normal driving may be made gradually. This procedure is made from the point of view that, should the magnitude of the lateral G become large, it is preferred to leave the control over the posture of the vehicle body up to the manual operation by the driver. On the other hand, if it is preferred to improve stability of the vehicle body by operating the four-wheel drive, rather than leaving the control over the posture of the vehicle body up to the manual operation by the driver, it is also possible to forcibly execute the normal driving at the independent mode, when it is decided at step W23 that the actual lateral G sensed by the sensor S15 is equal to or larger than the predetermined value.

On the other hand, when it is decided at step W23 that the actual lateral G sensed by the sensor S15 is smaller than the predetermined value, then the program flow goes to step W24 at which it is decided to determine if the manual switch S13 or S16 is turned off to inhibit the normal driving. If the result of decision at step W24 is YES, then the normal driving is inhibited at step W31.

If the result of decision at step W24 indicates that the manual switch S13 or S16 is not turned off, then program flow goes to step W25 at which it is decided to determine if the current running status of the vehicle exists in what area of a region, as hatched and indicated by symbol "X", which is preset by employing the steered angle of the steering wheel and the vehicle speed as parameters. After step W25, it is decided at step W26 to determine if the current running status of the vehicle is present in such a region as indicated by reference symbol "X". If the result of decision at step W26 is NO, then the normal driving is inhibited at step W31.

On the other hand, when it is decided at step W26 that the current running status exists in the region X, then the program flow goes to step W27 at which it is decided to determine if the manual switch S13 selects the "RAPID ACCELERATION" mode. When the result of this decision is NO, then the normal driving is executed at step W30, followed by the return of the program flow. On the other hand, when the result of the decision at step W27 is YES, then the program flow goes to step W28 at which it is decided to determine if the vehicle is being rapidly accelerated and then to step W30 at which the normal driving is executed when the result of the decision at step W28 indicates that the vehicle is rapidly accelerated, followed by proceeding to step W30 at which the normal driving is executed and then by the return of the program flow. On the other hand, if it is decided at step W28 that the vehicle is not rapidly accelerated, the normal driving is inhibited at step W29, followed by the return of the program flow.

It is further to be noted herein that the embodiment as specifically illustrated hereinabove can contain the following configurations, in addition to those as described hereinabove.

a. The left and right rear wheels 1RL and 1RR may be drivable with the engine 2 and the left and right front wheels 1FL and 1FR may be drivable with the motors ML and MR, respectively.

b. Each of the motors ML and MR may be of an electrically drivable type.

c. Only one motor may be provided, which is common with the left and right wheels, not independently from the left and right wheels. Further, when the motors ML and MR are driven at the time when the vehicle is cornering, a differential may be provided.

Figure 16:
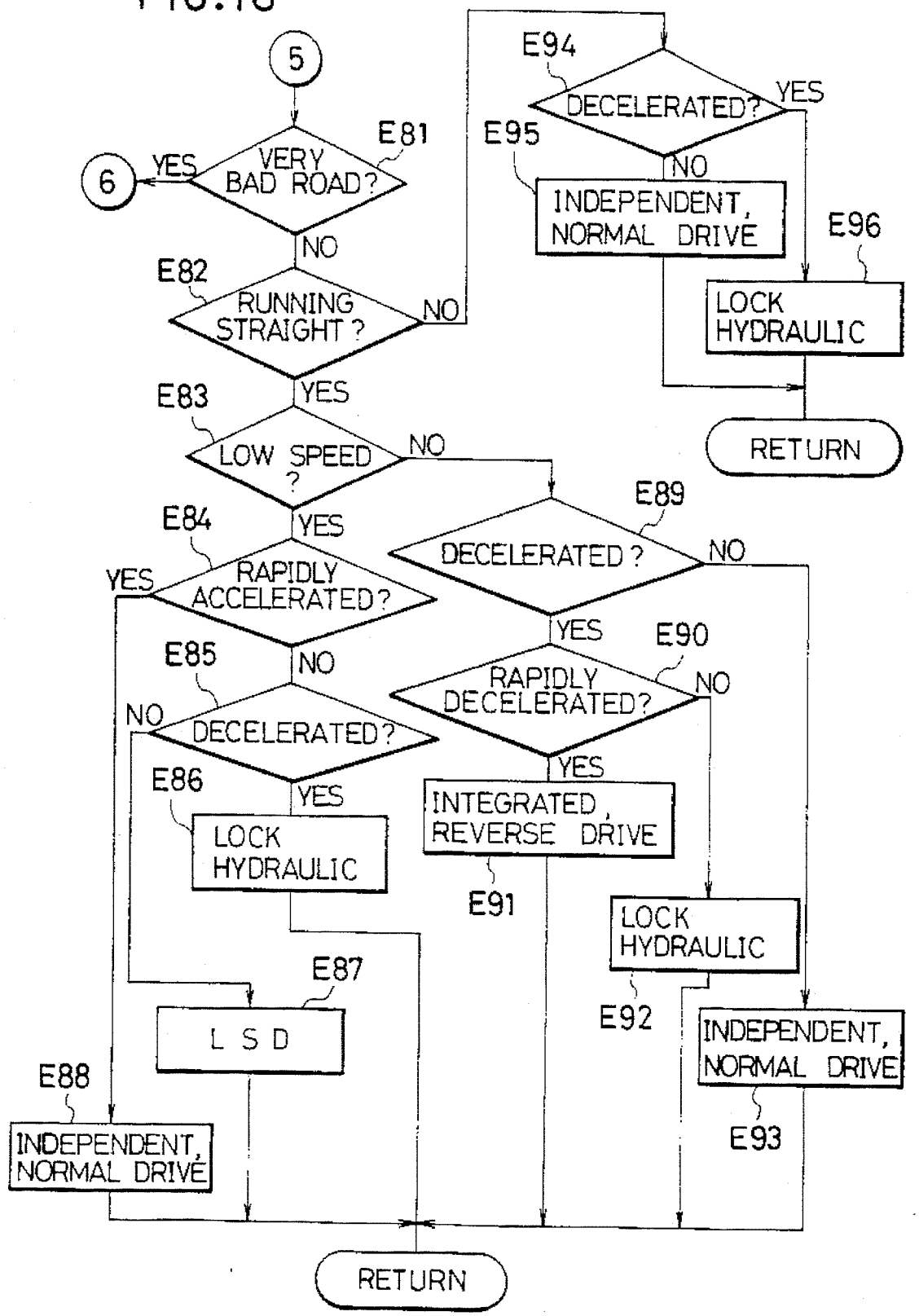
Figure 17:
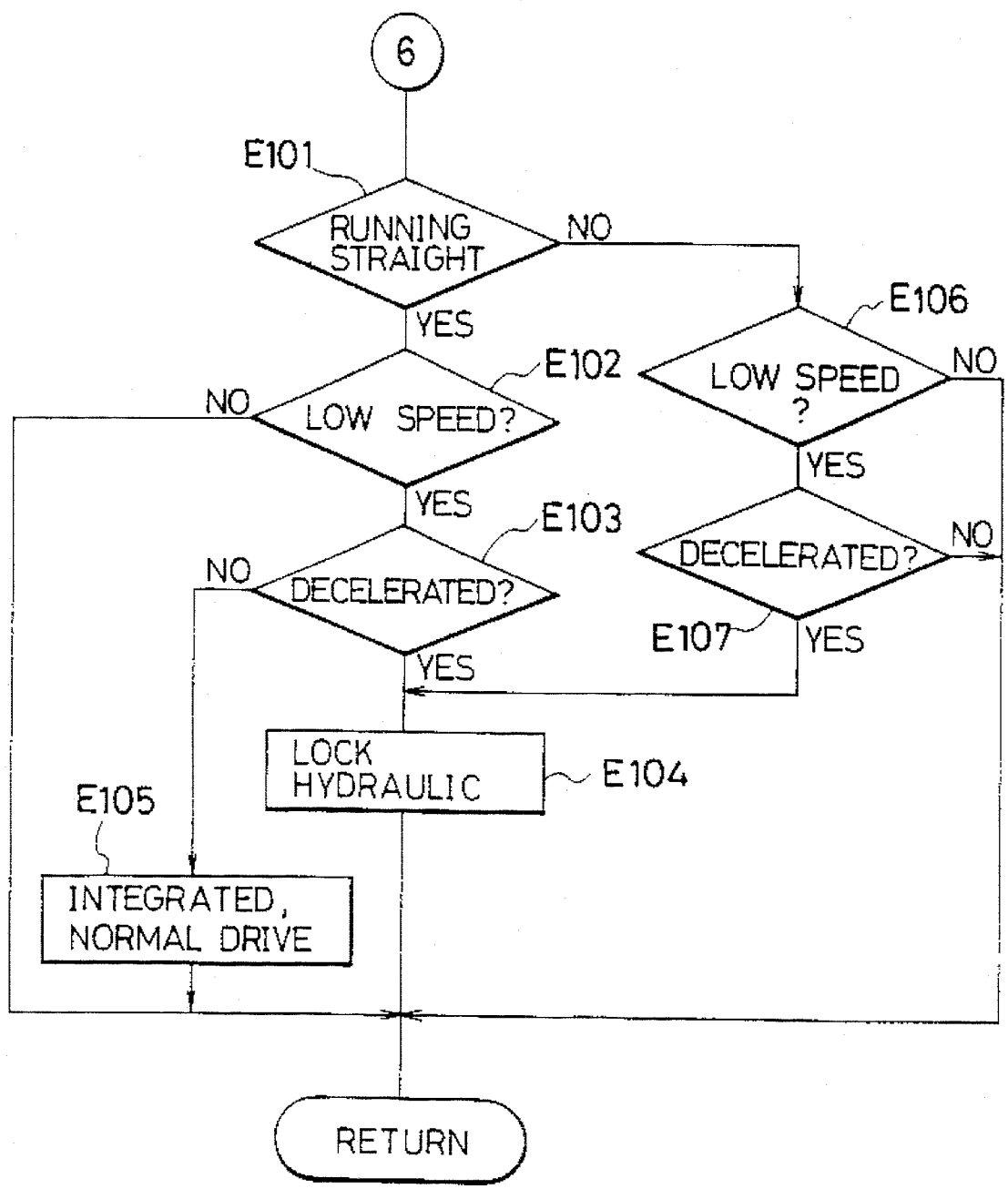

A further embodiment of the present invention is described with reference to FIGS. 13 and 16–17. In this embodiment, a flow chart as shown in FIGS. 16 and 17 are employed for controlling the running status of the vehicle in a bad road condition as replacement of the flow chart as shown in FIG. 14.

In this embodiment, the switches S13, S15 and S16 as shown in FIG. 2 are omitted from FIGS. 1–12 and 13. As a result, the flow chart at step D13 of FIG. 3 and the flow chart for execution decision in FIG. 8 (FIG. 15) corresponding to step D13 of FIG. 3 are omitted.

Specifically, when it is decided at step E23 that the road condition is bad, then the program flow goes to step E81 at which it is further decided to determine if the road condition is very bad. If the result of decision at step E81 is NO, that is, the road condition is not very bad, then the procedures at steps 82–96 are executed to thereby make a decision for a control mode on a less bad road condition. On the other hand, when it is decided at step E81 that the road condition is very bad, then the processes at steps E101 et seq are executed thereby make a decision for a control mode to be conducted in a very bad road condition.

More specifically, when it is decided at step E81 that the road condition is not very bad, then it is decided at step E82 to determine if the vehicle is running straight and it is further decided at step E83 to determine if the vehicle is running at a low speed when the result of decision at step E82 is YES. When the result of the decision at step E83 is YES, then the program flow goes to step E84 at which it is further decided to determine if the vehicle is being rapidly accelerated, followed by proceeding to step E85 at which it is additionally decided to determine if the vehicle is being decelerated when the result of decision at step E84 indicates that the vehicle is not rapidly accelerated. If the result of decision at step E85 is NO, then the LSD mode is executed at step E87, followed by the return of the program flow. On the other hand, when it is decided at step E85 that the vehicle is decelerated, then the hydraulic pressure-locking mode is executed at step W86, followed by the return of the program flow.

If it is decided at step E84 that the vehicle is rapidly accelerated, then the program flow goes to step E88 at which the normal driving is executed at the independent mode, followed by the return of the program flow.

Furthermore, if the result of decision at step E83 indicates that the vehicle is not running at a low speed, then the program flow goes to step E89 at which the decision is made to determine if the vehicle is being decelerated and then to step E90 at which the decision is further made to determine if the vehicle is being rapidly decelerated when the result of decision at step E89 is YES. When the decision at step E90 gives the affirmative result, then the reverse driving is executed at the integrated mode at step E91, followed by the return of the program flow. On the other hand, when it is decided at step E90 that the vehicle is not being rapidly decelerated, then the hydraulic pressure is locked at step E92, followed by the return of the program flow. Additionally, if the decision at step E89 indicates that the vehicle is not decelerated, then the program flow goes to step E93 at which the normal driving is executed at the independent mode, followed by the return of the program flow.

In addition, when it is decided at step E82 that the vehicle is not running straight, then it is further decided at step E94 to determine if the vehicle is being decelerated. When the result of this decision is NO, then the normal driving is executed at the independent mode at step E95, followed by the return of the program flow. On the other hand, when the decision at step E94 indicates that the vehicle is being decelerated, then the program flow goes to step E96 at which the hydraulic pressure-locking mode is executed, followed by the return of the program flow.

Furthermore, when it is decided at step E81 that the road condition is very bad, then the program flow goes to step E101 in FIG. 17. At step E101, it is decided to determine if the vehicle is running straight. When the result of this decision is YES, then the program flow goes to step E102 at which the decision is further made to determine if the vehicle is running at a low speed, followed by the return of the program flow when the result of this decision is No. On the other hand, when it is decided at step E102 that the vehicle is running at a low speed, it is additionally decided at step E103 if the vehicle is being decelerated. If the result of decision at step E103 is YES, then the hydraulic pressure-locking mode is executed at step E104, followed by the return of the program flow. On the other hand, when it is decided at step E103 that the vehicle is not being decelerated, the normal driving at the integrated mode is executed at step E105, followed by the return of the program flow. Further, the result of decision at step E1O1 indicates that the vehicle is not running straight, then the program flow goes to step E106 at which it is further decided to determine if the vehicle is running at a low speed, followed by proceeding to step E107 at which it is additionally decided to determine if the vehicle is being decelerated when the result of decision at step E106 is YES. When the decision at step E107 indicates that the vehicle is being decelerated, then the program flow goes to step E104 at which the hydraulic pressure-locking mode is executed, followed by the return of the program flow. On the other hand, when the result of decision at step E106 or 107 is NO, then the program flow is returned.

The embodiment as described immediately hereinabove can provide a variety of configurations to thereby achieve a variety of particular actions and functions.

The configuration of this embodiment as described in claim 29 below can improve stability of the vehicle body in running straight.

In this case, the system of the present invention as configured in such a manner as described in claim 30 below can ensure stability of the vehicle body in running straight when the motors ML and MR are driven. On the other hand, the system as configured as in claim 31 can ensure stability in running straight when no motors ML and MR are driven.

In addition, the configuration of this embodiment as described in claim 32 can perform the preferred functions that the coupling of the clutch is inhibited while the vehicle is running on a road surface having a low road surface friction coefficient μ onto whose surface the driving force is less likely to be transmitted effectively on the road having such a low road surface friction coefficient μ, in order to allow the driving force generated by the motors ML and MR to be efficiently transmitted onto the road surface.

Furthermore, the configuration as described in claim 33 can offer the preferred function to thereby ensure stability in running on a heavily rough or bad road.

In this case, the system of this embodiment as configured in a manner as described in claim 34 can prevent the occurrence of the situation in which a large degree of external force is entered toward the motors ML and MR from the respective driven wheels, while the coupling of the clutch is inhibited at the time of running at a high speed. This is preferred from the point of view of protecting the motors.

Additionally, the configuration as described in claim 35 can offer the preferred actions of ensuring stability in running straight at the time of deceleration and improving the braking ability.

In this case, the system as configured in such a manner as described in claim 36 can achieve the preferred functions of improving the braking ability as well as ensuring stability of the vehicle body at the time of running at a high speed at which a considerably large amount of braking force is required and the vehicle becomes likely to be instable.

The embodiment as shown in FIGS. 13 and 16–17 can additionally present the configurations as will be described hereinbelow.

a. The left and right rear wheels 1RL and 1RR may be drivable with the engine 2 and the left and right front wheels may be drivable with the motors ML and MR, respectively.

b. Each of the motors ML and MR may be of an electrically drivable type. In this case, the motors may be subjected to regenerative control in order to provide the action corresponding to the hydraulic pressure-locking mode.

Then, a still further embodiment of the present invention will be described with reference to FIGS. 18–22. This embodiment is directed to an example in which energy for driving the motors ML and MR is accumulated to thereby gain a torque larger than the maximal torque obtainable by the engine 2 and further in which the vehicle is allowed to run only by driving the motors ML and MR only, even if the engine 2 is suspended.

Figure 18:
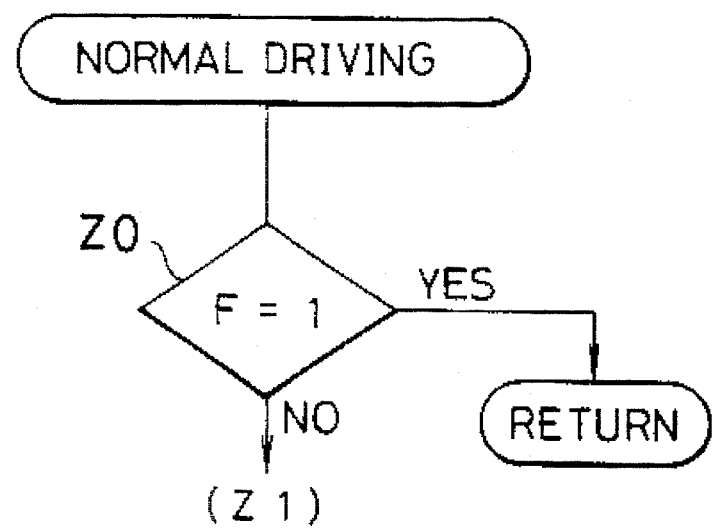

In this embodiment, the basic configuration is substantially the same as the configuration as shown in FIGS. 1–12, in which a sensor S17 and a switch S18 are provided in addition to the sensors and switches S1–S13 and step Z0 as shown in FIG. 18 is inserted before step Z1 of FIG. 9.

The sensor S17 is so adapted as to sense a pressure PO (accumulator pressure) within the accumulator 41 and it constitutes a means for detecting an amount of pressure accumulated. The switch S18 is an emergency switch for driving the vehicle body with the motors ML and MR only, even if the engine 2 is suspended. The switch S18 can be manually operated by shifting it between the OFF state in which the switch S18 is turned off and the ON state in which the output (volume) value is variable.

Further, a flag F for inhibiting the driving of the motors ML and MR to be set at step Z0 in FIG. 18 is set to "1" or "0" in FIGS. 20–21 in a manner as will be described hereinafter, and the procedures at steps Z1 et seq in FIG. 9 are executed when the result of decision at step Z0 indicates that the flag F is set to "0".

Figure 20:
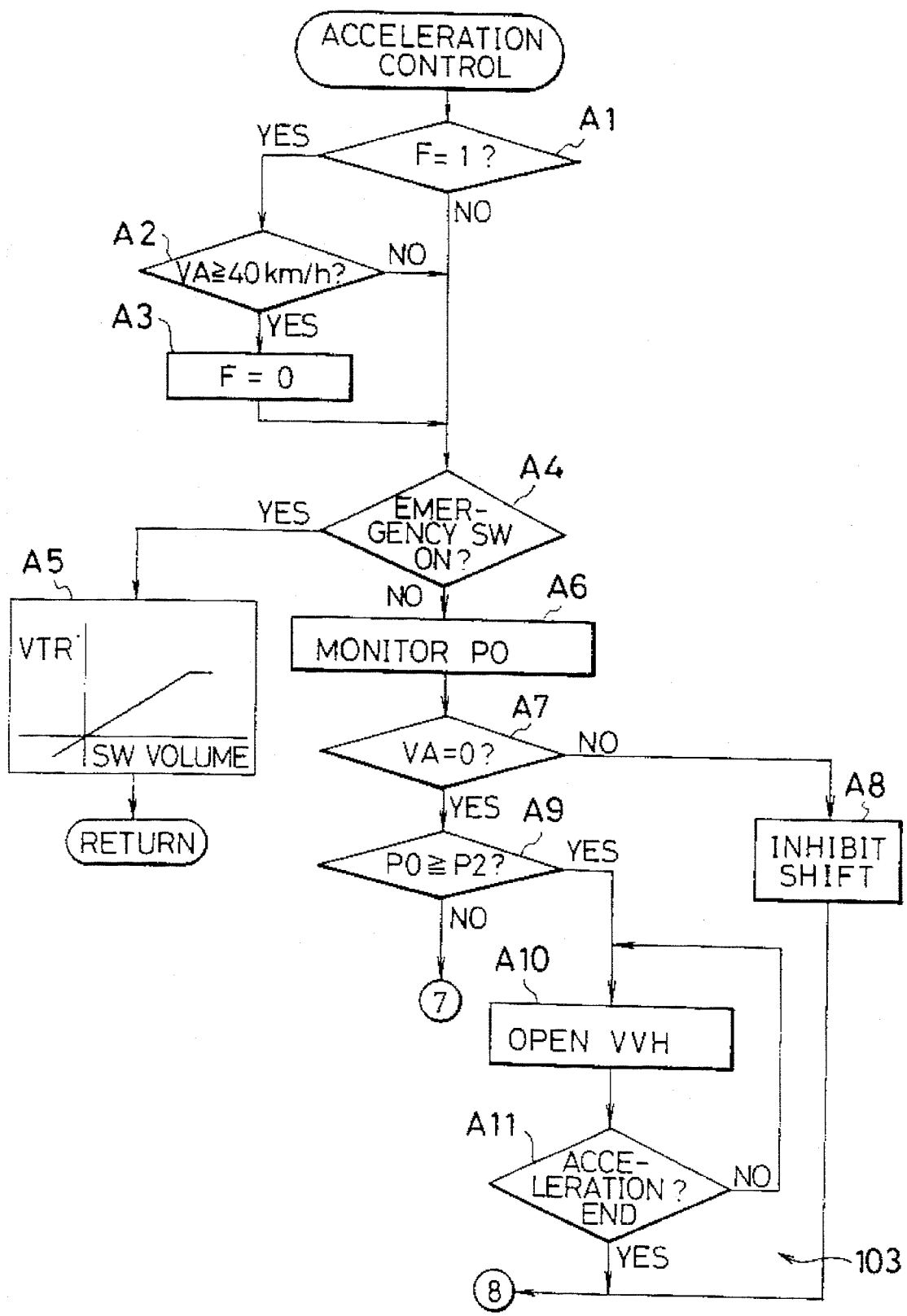
Figure 21:
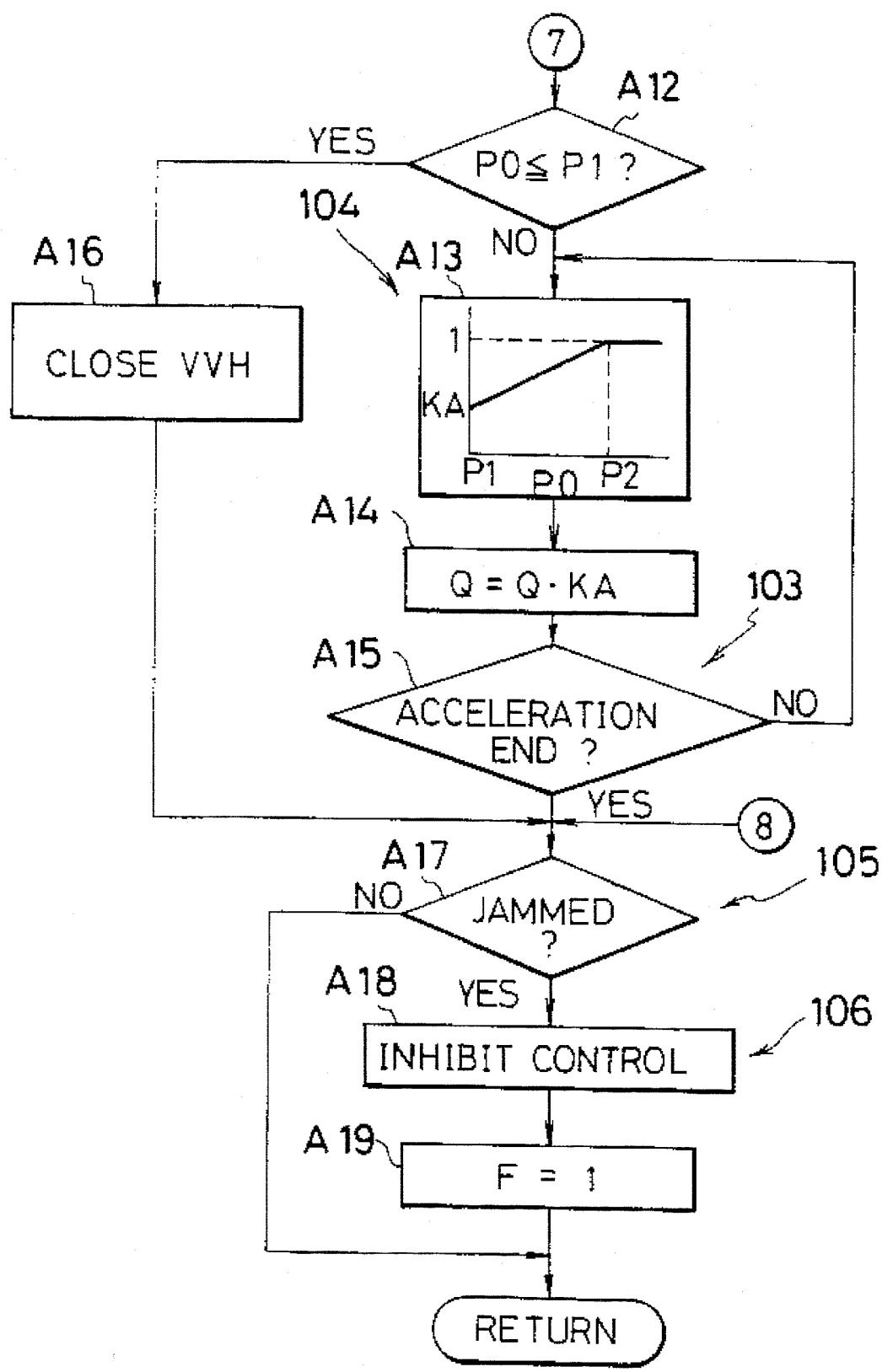

A description will now be made of the details of the control at the time of acceleration with the accumulator pressure, with reference to the flow charts as shown in FIGS. 20 and 21.

First, at step A1, it is decided to determine if the flag F for inhibiting the driving is set to "1". This flag is so adapted as to determine if application of the accumulator pressure PO to the motors ML and MR is inhibited.

When it is decided at step A1 that the flag F is set to "1", then the program flow goes to step A2 at which it is decided to determine if the vehicle speed VA is as slow as, for example, 40 km per hour or higher. When the result of this decision is YES, the flag F is set to "0" at step A3, followed by proceeding to step A4.

On the other hand, when it is decided at step A1 that the flag F is set to "0", that is, when the application of the accumulator pressure PO to the motors ML and MR is inhibited, the program flow goes to step A4. In addition, when it is decided at step A2 that the vehicle speed VA is slower than 40 km per hour, the program flow likewise proceeds to step A4.

Then, at step A4, it is decided to determine if the emergency switch S18 is turned on. When this decision gives the affirmative result, then the program flow goes to step A5 at which the target vehicle speed VTR corresponding to an output value of the emergency switch S18 is determined on the basis of a map set in advance so as to increase the target vehicle speed VTR in accordance with an increase in the output value (volume value) of the emergency switch S18, followed by the return of the program flow.

On the other hand, when the result of the decision at step A4 indicates that the emergency switch S18 is turned off, then the program flow goes to step A6 at which the accumulator pressure PO is monitored, followed by proceeding to step A7 at which it is decided to determine if the vehicle speed VA is set to zero. If the result of decision at step A7 is NO, the shift during acceleration is inhibited at step A8, followed by proceeding to step A17 in FIG. 21.

Figure 19:
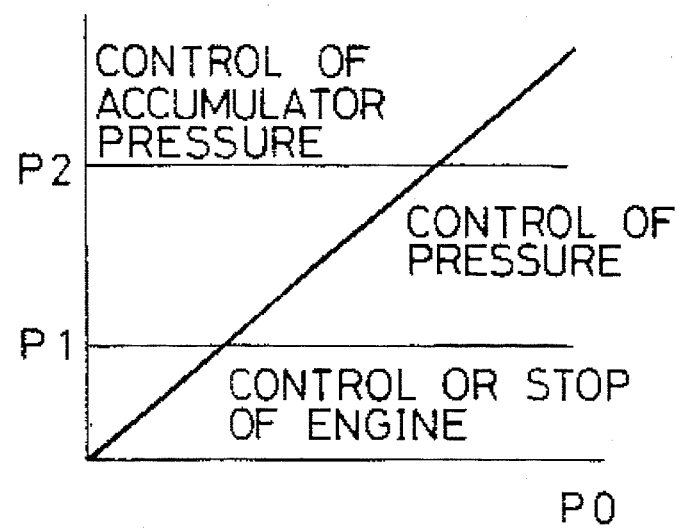

When the result of decision at step A7 indicates that the vehicle speed VA is set to "0", then the program flow goes to step A9 at which the accumulator pressure PO is equal to or larger than a second set value P2 that is the lower limit value of a control range for controlling the accumulator pressure PO capable of executing the control for increasing the acceleration of the vehicle by driving the motors ML and MR, as shown in FIG. 19. When the result of decision at step A9 indicates that the accumulator pressure PO is equal to or larger than the second set value P2, then the program flow goes to step A10 at which the load-and-unload valve VVH is opened, thereby releasing the discharge pressure of the pump P and, at the same time, controlling the accumulator pressure PO for controlling the motors ML and MR only by the accumulator pressure PO. Thereafter, at step A11, it is decided to determine if the transmission 4 is shifted and the acceleration of the vehicle is finished, for example, on the basis of an output signal from the sensor S6. The procedures at steps A10 and A11 are repeated until the result of decision at step A11 gives the affirmative result, followed by proceeding to step A17 in FIG. 21.

On the other hand, when it is decided at step A9 that the accumulator pressure PO is lower than the second set value P2, then the program flow goes to step A12 at which it is decided if the accumulator pressure PO is equal to or lower than a first set value P1 that is set lower than the second set value P2. The first set value P1 is the lower limit value of a control range for controlling a pressure for making the flow rate Q of the operating liquid to be supplied to the motors ML and MR variable in accordance with the accumulator pressure PO, as shown in FIG. 19. When the result of decision at step A12 in FIG. 21 indicates that the accumulator pressure PO is higher than the first set value P1, then the program flow goes to step A13 at which a correction coefficient KA corresponding to the decreased accumulator pressure PO is determined from a map set in advance so as to decrease the correction coefficient KA in accordance with a decrease in the accumulator pressure PO. Thereafter, at step A14, a new flow rate Q is computed by multiplying the basic flow rate Q to be supplied to each of the motors ML and MR with the correction coefficient KA, followed by proceeding to step A15 at which it is decided to determine if the transmission 4 has been shifted and the acceleration of the vehicle has been finished, for example, on the basis of the output signal from the gear position sensor S6, in substantially the same manner as at step A11. Whenever the decision at step A15 gives the negative result, the procedures at steps A13 and A14 are repeated until the decision at step A15 becomes the affirmative result. When the decision at step A15 gives the affirmative result, then the program flow goes to step A17.

On the other hand, when it is decided at step A12 that the accumulator pressure PO is equal to or smaller than the first set value P1, then the load-and-unload valve VVH is closed at step A16 and communicated with the motors ML and MR, thereby controlling the engine 2 so as to control the driving of the motors ML and MR on the basis of the discharge pressure of the pump P. Then, the program flow goes to step A17.

Then, at step A17, it is decided to determine if the vehicle is in a jammed state. This decision is made to determine if the vehicle speed per unit hour is lower than, for example, 10 km per hour or slower and it is decided that the vehicle is in a jammed state when its vehicle speed is lower than, for example, 10 km per hour or slower. When the result of this decision is NO, then the program flow is returned. On the other hand, when the decision at step A17 gives the affirmative result, then the control of the motors ML and MR is inhibited at step A18 by setting the flow rate Q of the operating oil to the motors ML and MR to zero, followed by setting the flag F to "1" at step A19 and thereafter returning the program flow.

Figure 22:
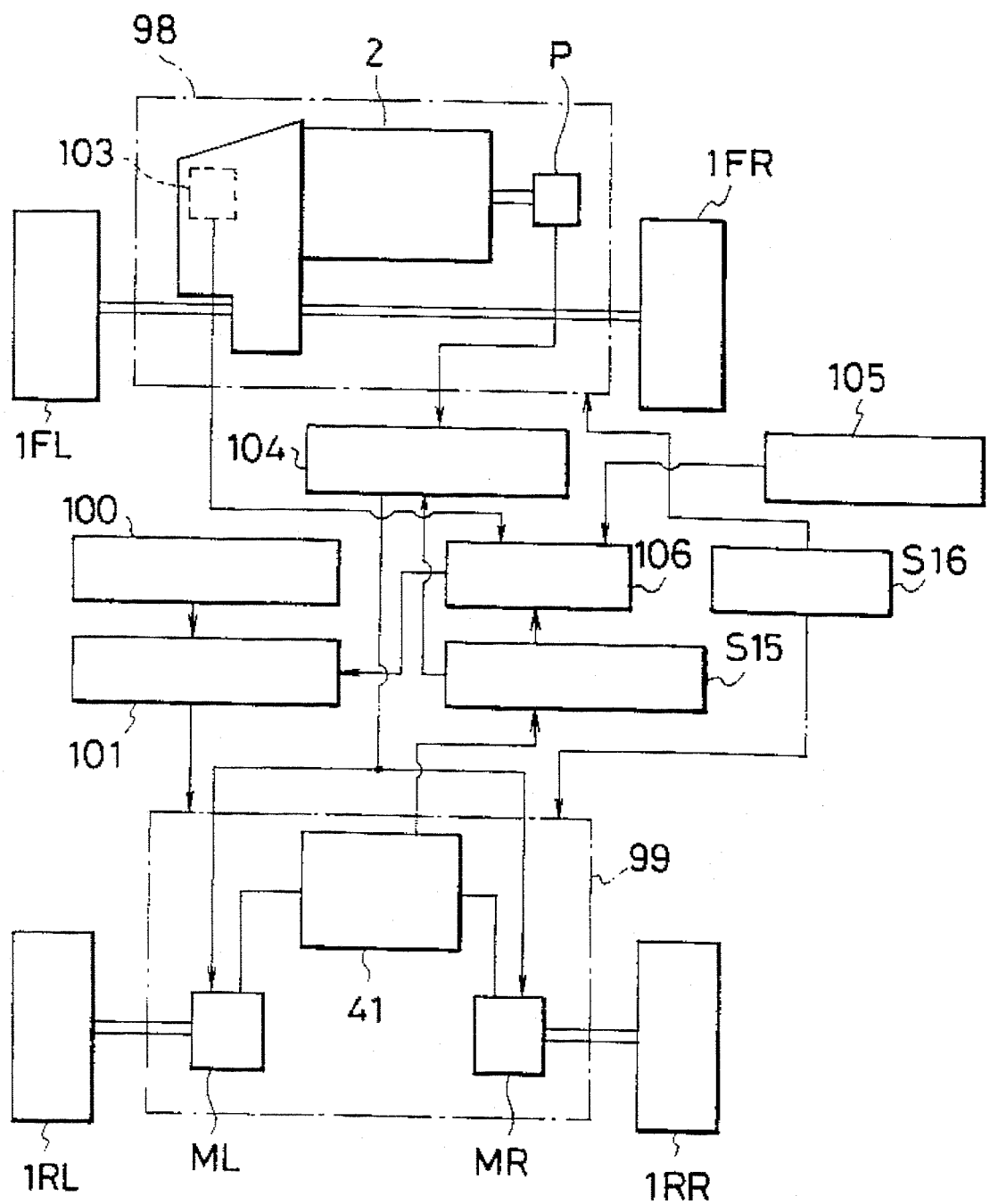

In the embodiments according to the present invention, as shown in FIG. 22, reference numeral 100 designates an acceleration detecting means for detecting the state of acceleration of the vehicle body, which is constituted by the steps E27 and E41.

As shown in FIG. 22, reference numeral 101 denotes an acceleration control means 101 for controlling the extent of acceleration by operating the motors ML and MR by means of the accumulator pressure PO of the accelerator 41 when the state of acceleration of the vehicle body is detected by the acceleration detecting means 100. The acceleration control means 101 is constituted by the steps E28 and E42.

The steps A11 and A15 constitute a shift detecting means 103 for detecting a shift of the transmission 4.

Reference numeral 104 designates an energy control means which is constituted by the steps A9, A12–A14 and A16. The energy control means 104 is such that, when the accumulator pressure PO (an amount of energy accumulated) detected by the pressure sensor S17 is lower than the second set value P2 yet equal to or higher than the first set value P1, the flow rate Q of the operating oil to be fed to the motors ML and MR is decreased in accordance with a decrease in the accumulator pressure PO and, on the other hand, when the accumulator pressure PO is decreased to a value equal to or lower than the first set value P1, the motors ML and MR are driven with the discharge pressure of the pump P serving as an energy generating means.

In addition, reference numeral 105 denotes a traffic-jam detecting means for detecting a jammed state of the vehicle and the step A17 constitutes the traffic-jam detecting means.

Furthermore, reference numeral 106 designates an inhibition means for inhibiting the operation of a second drive means 99 (the accumulator 41 serving as an energy-accumulating means and the motors ML and MR) by the acceleration control means 101 when the shift of the transmission 4 is detected by the shift detecting means 103 or when the jammed state in which the vehicle is placed is detected by the traffic-jam detecting means 105. The steps A18 and A19 constitute the inhibition means 106.

In FIG. 22, reference numeral 98 denotes a first drive means constituted mainly by the engine 2; reference symbol S15 denotes the sensor serving as a means for detecting the amount of pressure accumulated; and reference symbol S16 denotes the switch serving as a shift means.

In the embodiments as described hereinabove, the hydraulic pressure is accumulated in the accumulator 41 as energy for driving the motors ML and MR at the time of deceleration of the vehicle and the accumulator pressure PO of the accumulator 41 is fed to thereby drive the motors ML and MR at the time of acceleration, thereby driving the left and right rear wheels 1RL and 1RR independently from the driving force generated by the engine 2. Hence, the vehicle can ensure the extent of the driving force greater than the output generated by the engine 2 on account of the fact that the driving force from the motors ML and MR is produced by driving the motors ML and MR with the accumulator pressure PO, thereby increasing the acceleration of the vehicle. As a result, the rearward inclination of the vehicle body, that is, an anti-dive action, to be caused at the time of rapid acceleration of the vehicle, can be prevented, thereby ensuring stability in the position or posture of the vehicle body as well as improving drivability.

As the shift of the transmission 4 is detected in such a state that the accumulator pressure PO is applied to the motors ML and MR, the state of acceleration of the vehicle is regarded as completed and the application or supply of the accumulator pressure PO is inhibited. In other words, the supply of the accumulator pressure PO is finished at the same time as the shift of the transmission 4, which creates a feeling of changes of acceleration, has been finished; hence, no undesirable feeling is given to the driver when the extent of acceleration of the vehicle is enhanced by the supply of the accumulator pressure PO to the motors ML and MR for driving the secondarily driven wheels.

Further, the accumulator pressure PO at the accumulator 41 is monitored by the pressure sensor S17 and the flow rate Q of the operating oil to be supplied to the motors ML and MR is decreased in accordance with a decrease in the accumulator pressure PO when the accumulator pressure PO detected by the pressure sensor S17 is determined as exceeding the first set value P1 and as being equal to or smaller than the second set value P2. Even if the accumulator pressure PO is as low as described above, the supply of the operating liquid at the flow rate Q to the motors ML and MR is suppressed so as to compensate for such a decrease of the accumulator pressure PO, thereby allowing the accumulator pressure PO to be employed for driving the motors ML and MR over a long period of time at the time of acceleration of the vehicle and ensuring stability in acceleration thereof.

In addition, when the accumulator pressure PO detected by the pressure sensor S17 is equal to or smaller than the first set value P1, the load-and-unload valve VVH is closed to inhibit the application of the accumulator pressure PO to the motors ML and MR and the motors ML and MR are driven on the basis of the hydraulic pressure from the pump P operated by the driving force generated by the engine 2. Hence, even if the accumulator pressure PO is low, the motors ML and MR can be driven by the hydraulic pressure from the pump P, thereby ensuring acceleration of the vehicle and preventing a shock in advance from occurring due to a decrease in the hydraulic pressure to be fed to the motors ML and MR from the accumulator 41 during the application of the accumulator pressure PO by the second driving means 99 because the control of operating the motors ML and MR by the application of the accumulator pressure PO is inhibited.

Furthermore, the application of the accumulator pressure PO to the motors ML and MR is inhibited when the vehicle is in a jammed state. In other words, when the vehicle is confined in a jammed state, the extent of requirement for an increase in acceleration is considered so low that the application of the accumulator pressure PO to the motors ML and MR can be inhibited, thereby preventing the accumulator pressure PO from being consumed in vain.

For example, even when the vehicle cannot move at a crossing due to an engine failure or when the vehicle should start up in midnights or early mornings without causing noises of the engine 2, the vehicle can be started on the basis of the accumulator pressure PO accumulated in the accumulator 41 by turning the emergency switch S18 on, setting the target vehicle speed VTR in accordance with the output value (volume value) in the ON state of the emergency switch S18, and making the vehicle speed become the target vehicle speed VTR. Further, it is possible to suppress such an anti-dive action or other changes of the positions or postures of the vehicle body from occurring at the time of rapid acceleration, thereby competing with abnormal situations.

In this case, it is also possible to shift the emergency switch S18 between its ON state and its OFF state, as needed, thereby enabling a shift between the state in which the vehicle is driven by both of the engine 2 and the motors ML and MR and the state in which the vehicle is driven only by the motors ML and MR.

The embodiment as described immediately hereinabove can achieve the advantageous functions and actions as will be described hereinafter.

The configuration as described in claim 38 can start driving the vehicle only with the driving energy accumulated with the energy-accumulating means, thereby suppressing the positions or postures of the vehicle body from changing at the moment of starting in a four-wheel drive state and, at the same time, improving the ability of starting driving the vehicle. Further, the vehicle can be started only with the actuator without employing the engine output; hence, the vehicle can be started with certainty even in an abnormal situation, for example, in which an engine failure happens.

Further, the configuration as described in claim 39 is such that the shift can be made between the state in which both of the first and second driving means are to be operated and the state in which only the second driving means is to be operated. This shift is to be made as needed, thereby improving convenience of usage.

The drive system as described in claim 1 is configured in such a manner, as described in claim 40, that the state of acceleration is detected and the second driving means is operated as the accelerated state is detected. This configuration allows the actuator to be operated during the period of acceleration with the drive energy accumulated in the energy-accumulating means and to assist the engine output, thereby ensuring the driving force larger than the engine output at the time of acceleration and improving drivability of the vehicle.

Further, the drive system as described in claim 41 involves detecting the amount of the energy accumulated by the energy-accumulating means and inhibiting the operation of the second driving means when the amount of the accumulated energy detected is found smaller than the predetermined value. This configuration can prevent a shock from occurring due to the disconnection of assistance in acceleration by inhibiting the application of the driving energy to be fed to the actuator from the energy-accumulating means during the period when the acceleration is assisted by the second driving means.

In addition, the system is configured as described in claim 42 in such a way that the amount of the energy accumulated by the energy-accumulating means is detected and, when the amount of the accumulated energy detected is found smaller than the predetermined value, the actuator is operated with the driving energy to be supplied from the energy generating means drivable by the engine, in the manner as in claim 41, thereby providing the driving energy for driving the actuator even if the amount of the energy accumulated in the energy-accumulating means is small and ensuring acceleration of the vehicle.

Furthermore, the configuration as described in claim 43 is such that the shift of the gear shift position of the transmission is detected and the operation of the second driving means is inhibited when the shift of the gear shift position thereof is detected, thereby allowing the assistance in acceleration by driving the second driving means to be suspended together with the shift of the gear shift position of the transmission, which provides for a feeling of changes of acceleration. This configuration can prevent the driver and passenger from perceiving an undesirable feeling to be caused by the suspension of the assistance in acceleration by suppressing the operation of the actuator.

The drive system, as configured as described in claim 44, involves detecting the amount of the driving energy accumulated by the energy-accumulating means and changing the driving-energy to be supplied to the actuator in accordance with the amount of the driving energy accumulated therein when the amount thereof detected is equal to or smaller than the predetermined value. This drive system can drive the actuator by gradually employing the driving energy accumulated in the energy-accumulating means, thereby allowing for a long-term utilization of the driving energy accumulated therein at the time of acceleration and ensuring stability in acceleration of the vehicle.

The vehicle drive system as configured as described in claim 45 involves detecting a jammed state which the vehicle faces and inhibiting the assistance in acceleration by the actuator by inhibiting the operation of the second driving means at the time of an encounter of the vehicle with such a jammed state, when the extent of a requirement for increasing acceleration is considered low. This configuration can prevent the driving energy accumulated in the energy-accumulating means from being consumed in a useless way.

Further, the vehicle drive system is configured as described in claim 46 in such a fashion that the actuator is comprised of a fluid pressure motor so adapted as to generate the force of driving the rotation on the basis of the fluid pressure and the energy-accumulating means is comprised of an accumulator so adapted as to accumulate the fluid pressure. In addition, the vehicle drive system, as configured as described in claim 47, is such that the actuator is comprised of an electrically drivable motor so adapted as to generate the force of driving the rotation by means of electricity and the energy-accumulating means is comprised of a battery for accumulating electricity. Hence, these elements comprise the specific configuration for the actuator and the energy-accumulating means as defined in the invention as described in claim 1.

In addition, the vehicle drive system according to the embodiment as shown in FIGS. 18–22 may be configured in such a manner as will be described hereinafter.

a. The driving of the motors ML and MR may not be conducted whatsoever when the mode (the integrated mode or independent mode) selected by the manual switch S13 differs from the mode (the integrated mode or independent mode) in which the control conditions are established at step D12 (FIGS. 4–7) in FIG. 3.
   b. The driving of the motors ML and MR may be conducted even in a bad road condition in substantially the same manner as in a good road condition.
   c. The control regions in which the control is made at the integrated mode and the independent mode so as to comply with the driving in a bad road condition may be set prior to the selection of the mode by the manual switch S13.

Further, the control at the independent mode only is allowed at the time of driving in a very bad road condition, while the control at the integrated mode is allowed at the time of driving in a less bad road condition. Conversely, it is possible to allow for the control at the integrated mode only during driving in a very bad road condition and for the control at the independent mode during driving in a less bad road condition.

d. The left and right rear wheels 1RL and 1RR may be driven with the engine 2 and the left and right front wheels 1FL and 1FR may be driven with the motors ML and MR. Further, the actuator may be replaced with an electrically drivable motor, in place of the motors ML and MR. In this case, the energy-accumulating means is comprised of a battery or a condenser for accumulating electricity serving as driving energy for driving the electrically drivable motor. In addition, the driving may always be conducted with the motors ML and MR during running.
   e. When the vehicle is running straight, the independent mode is set at the time of driving at a low speed and the integrated mode is set at the time of driving at a high speed. Although this setting may be made on a road having a high road surface friction coefficient $\mu$, this setting may preferably be made on a road, in particular having a low road surface friction coefficient $\mu$. This embodiment can improve drivability particularly at a low speed and satisfy stability in running straight at a high speed, particularly when the vehicle is running on a road having such a low road surface friction coefficient $\mu$.

Furthermore, the first embodiment as shown in FIGS. 1–12 may allow the motors ML and MR to be driven by employing the accumulator 41 in such a manner as will be described hereinafter.

1. A manual switch may be provided to thereby select the execution of the driving (normal driving and reverse driving) of the rear wheels by means of a motor. The motor may be driven temporarily by taking advantage of only the portion of pressure accumulated by the accumulator 41.
   2. When the motor only may be driven temporarily by taking advantage of only the portion of pressure accumulated by the accumulator 41, the pump P to be drivable by the engine 2 may not be needed. In this case, nothing about a hydraulic pressure-accumulating circuit with the motors ML and MR employed as hydraulic pressure-accumulating pumps is required.
   3. There is no need for such a hydraulic pressure-accumulating circuit as comprised of the hydraulic pressure-accumulating lines 42L and 42R. In this case, no pump P drivable by the engine 2 is needed.
   4. The left and right rear wheels 1RL and 1RR may be drivable by the engine 2 and the left and right front wheels 1FL and 1FR may be drivable by the motors ML and MR.
   5. Only one motor may be disposed in common with the left and right wheels. In this case, when the driving of the motor is executed even during cornering, a differential may be provided.
   6. In order to drive the motor, for example, while the vehicle is running at a constant speed on a road having a low road surface friction coefficient $\mu$ and, at the same time, to satisfy acceleration to a sufficient extent by utilizing the driving of the motor, the pump P is driven in such a state that the hydraulic pressure for acceleration is always left in the accumulator 41. However, it is preferred to suspend the driving of the pump P, in particular, when the vehicle is being accelerated, by opening the valve VVF, decreasing the discharge volume of the pump P rapidly to a very low extent, and disconnecting an electromagnetic clutch interposed between the engine 2 and the pump P.

While the invention has been described by reference to specific embodiments chosen for purposes of illustration, it should be apparent that a number of modifications and variations could be made thereto by those skilled in the art without departing from the spirit and scope of the invention.

What is claimed is:

1. A drive system for driving an automotive vehicle having one of a) left and right front wheels and b) left and right rear wheels driven with an engine as primarily driven wheels and the other driven with a motor means as secondarily driven wheels, comprising:

motor means comprising a left motor for driving the left secondarily driven wheel and a right motor for driving the right secondarily driven wheel;

a first control means for controlling in an integrated mode, for controlling forceable driving of said left motor and said right motor in a way such that a number of rotations of said left secondarily driven wheel and said right secondarily driven wheel become identical to each other, when a running state of the vehicle exists in a preset first control region; and a second control means for controlling in an independent mode, for discretely and separately controlling the forceable driving of said left motor and said right motor in a way such that a number of rotations of each of said left secondarily driven wheel and said right secondarily driven wheel become discretely and separately preset number of rotations for each of said left secondarily driven wheel and said right secondarily driven wheel, respectively, when a running state of the vehicle exists in a second control region preset as a region different from said first control region.

2. A vehicle drive system as claimed in claim 1, wherein a control mode by said first control means includes a control mode for normal driving so adapted as to drive said secondarily driven wheels in the same direction as the running direction in which the vehicle is running and a control mode for reverse driving so adapted as to drive said secondarily driven wheels in a braking direction in which the vehicle is braked.

3. A vehicle drive system as claimed in claim 1, wherein a control mode by said second control means includes a control mode for normal driving so adapted as to drive said secondarily driven wheels in the same direction as the running direction in which the vehicle is running and a control mode for reverse driving so adapted as to drive said secondarily driven wheels in a braking direction in which the vehicle is braked.

4. A vehicle drive system as claimed in claim 1, further comprising:
a clutch for mechanically coupling said left and right secondarily driven wheels;
wherein said clutch is coupled at the time of the controlling by said first control means and the coupling of said clutch is released at the time of the controlling by said second control means.

5. A vehicle drive system as claimed in claim 1, wherein said left motor and said right motor are driven in a same condition so as for the target numbers of rotation of said left and right secondarily driven wheels to become identical to each other, when the controlling is made by said first control means.

6. A vehicle drive system as claimed in claim 1, wherein each of said first and second control regions is controlled by said first control means when the vehicle is running straight in a road condition having a high road surface friction coefficient μ and by said second control means when the vehicle is running straight in a road condition having a low road surface friction coefficient μ.

7. A vehicle drive system as claimed in claim 1, wherein a control by said first control means is inhibited in a predetermined control region.

8. A vehicle drive system as claimed in claim 7, wherein said predetermined control region is set as a region having a low road surface friction coefficient μ.

9. A vehicle drive system as claimed in claim 7, wherein said predetermined control region is set as a region having a rough or bad road condition.

10. A vehicle drive system as claimed in claim 1, wherein said second control region is a region containing at least a region where the vehicle is cornering.

11. A vehicle drive system as claimed in claim 1, wherein each of said first and second control regions is controlled by said first control means when the vehicle is running straight and by said second control means when the vehicle is cornering.

12. A vehicle drive system as claimed in claim 1, wherein each of said first and second control regions is controlled by said first control means when the vehicle is running straight at a high speed and by said second control means when the vehicle is running straight at a low speed.

13. A vehicle drive system as claimed in claim 1, further comprising a control-region altering means for altering each of said first and second control regions.

14. A vehicle drive system as claimed in claim 13, wherein said second control region is expanded to an area wider when the vehicle is running in a road condition having a low road surface friction coefficient μ than when the vehicle is running in a road condition having a high road surface friction coefficient μ.

15. A vehicle drive system as claimed in claim 1, wherein:
the controlling by said second control means only is made when the vehicle is running in a bad road condition by inhibiting the control by said first control means; and
the control by said first control means only is made when the vehicle is running in a less bad road condition by inhibiting the control by said second control means.

16. A vehicle drive system as claimed in claim 1, wherein:
the control by said first control means only is made when the vehicle is running in a bad road condition by inhibiting the control by said second control means; and
the control by said second control means only is made when the vehicle is running in a less bad road condition by inhibiting the control by said first control means.

17. A vehicle drive system as claimed in claim 1, wherein the controlling by said second control means is made so as for said target numbers of rotation of said left and right secondarily driving wheels to become equal to each other or to become different from each other.

18. A vehicle drive system as claimed in claim 17, wherein:
when the controlling is made by said second control means,
said target numbers of rotation of said left and right secondarily driven wheels are set so as to become different from each other when the vehicle is cornering; and
said target numbers of rotation of said left and right secondarily driven wheels are set so as to become identical to each other when the vehicle is running straight.

19. A vehicle drive system as claimed in claim 1, further comprising a selection means for manually selecting control by one of said first control means and said second control means.

20. A drive system for driving an automotive vehicle having one of a) left and right front wheels and b) left end right rear wheels driven with an engine as primarily driven wheels and the other driven with a motor means as secondarily driven wheels, comprising:
a drive control means for controlling the driving of said motor means so as to drive said secondarily driven wheels in the same direction in which said primarily driven wheels are driven with said engine, only when a running state of said vehicle exists in a predetermined driving region; and
a driving-region altering means for altering said driving region in accordance with said running state of the vehicle, said driving-region altering means being adapted as to alter said driving region on the basis of a lateral G-force acting upon the vehicle body.

21. A drive system for driving an automotive vehicle having one of a) left and right front wheels and b) left and right rear wheels driven with an engine as primarily driven wheels and the other driven with a motor means as secondarily driven wheels, comprising:
a drive control means for controlling the driving of said motor means so as to drive said secondarily driven wheels in the same direction in which said primarily driven wheels are driven with said engine, only when a running state of said vehicle exists in a predetermined driving region; and a driving-region altering means for altering said driving region in accordance with said running state of the vehicle, said driving-region altering means being adapted as to alter said driving region on the basis of a road surface friction coefficient μ.

22. A drive system for driving an automotive vehicle having one of a) left and right front wheels and b) left and right rear wheels driven with an engine as primarily driven wheels and the other driven with a motor means as secondarily driven wheels, comprising:

a drive control means for controlling the driving of said motor means so as to drive said secondarily driven wheels in the same direction in which said primarily driven wheels are driven with said engine, only when a running state of said vehicle exists in a predetermined driving region; and a driving-region altering means for altering said driving region in accordance with said running state of the vehicle, said driving-region altering means being adapted as to alter said driving region on the basis of a steered angle of a steering wheel.

23. A drive system for driving an automotive vehicle having one of a) left and right front wheels and b) left and right rear wheels driven with an engine as primarily driven wheels and the other driven with a motor means as secondarily driven wheels, comprising:

a drive control means for controlling the driving of said motor means so as to drive said secondarily driven wheels in the same direction in which said primarily driven wheels are driven with said engine, only when a running state of said vehicle exists in a predetermined driving region; and a driving-region altering means for altering said driving region in accordance with said running state of the vehicle, said driving-region altering means being adapted as to alter said driving region on the basis of a road condition.

24. A drive system for driving an automotive vehicle having one of a) left and right front wheels and b) left and right rear wheels driven with an engine as primarily driven wheels and the other driven with a motor means as secondarily driven wheels, comprising:

a drive control means for controlling the driving of said motor means so as to drive said secondarily driven wheels in the same direction in which said primarily driven wheels are driven with said engine, only when a running state of said vehicle exists in a predetermined driving region; and a driving-region altering means for altering said driving region in accordance with said running state of the vehicle, said driving-region altering means being adapted to alter said driving region by employing at least a vehicle speed, a steered angle of a steering wheel and a road surface friction coefficient μ as parameters.

25. A drive system for an automotive vehicle having one of, a) left and right front wheels and b) left and right rear wheels driven with an engine as primarily driven wheels and the other driven with a motor means as secondarily driven wheels, comprising:

said motor means comprising a pair of left and right motors disposed for driving said left and right secondarily driven wheels discretely and separately; and a clutch for mechanically coupling said left and right secondarily driven wheels to each other when a predetermined condition is set.

26. A vehicle drive system as claimed in claim 25, wherein said clutch is coupled on condition that the vehicle is running straight.

27. A vehicle drive system as claimed in claim 26, wherein said clutch is coupled in a predetermined state in which said secondarily driven wheels are driven with said motor.

28. A vehicle drive system as claimed in claim 26, wherein said clutch is coupled in a predetermined state in which said secondarily driven wheels are not driven with said motor.

29. A vehicle drive system as claimed in claim 25, wherein the coupling of said clutch is inhibited when the vehicle is running on a road having a low road surface friction coefficient μ.

30. A vehicle drive system as claimed in claim 25, wherein the coupling of said clutch is inhibited in a predetermined state in which a road condition is bad.

31. A vehicle drive system as claimed in claim 25, wherein the coupling of said clutch is inhibited when the vehicle is running on a road having or bad road condition at a vehicle speed identical to or higher than a predetermined vehicle speed.

32. A vehicle drive system as claimed in claim 25, further comprising a resistance increasing means for increasing resistance to rotation of said motor means in a state in which said motor does not generate a driving force;

wherein said clutch is coupled and said resistance increasing means is set so as to be operated on condition that the vehicle is being decelerated.

33. A vehicle drive system as claimed in claim 32, wherein said clutch is coupled and said resistance increasing means is operated when the vehicle is being decelerated and running at a high speed.

* * * * *